US012761034B2

(12) United States Patent
Zahid et al.

(10) Patent No.: US 12,761,034 B2
(45) Date of Patent: Oct. 13, 2026

(54) VEHICLE MODIFICATIONS BASED ON A DETERMINED DESTINATION

(71) Applicant: TOYOTA MOTOR NORTH AMERICA, INC., Plano, TX (US)

(72) Inventors: Imad Zahid, Carrollton, TX (US); Livesey N. George, Allen, TX (US); Indhar C. Gopalakrishnan, Allen, TX (US); William J. Elmore, Dallas, TX (US); Daisuke Muramoto, McKinney, TX (US); Preeya Samudrala, Plano, TX (US); Reshma Thomas, Dallas, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 195 days.

(21) Appl. No.: 18/382,013

(22) Filed: Oct. 19, 2023

(65) Prior Publication Data

US 2025/0130058 A1 Apr. 24, 2025

(51) Int. Cl.
*G01C 21/36* (2006.01)

(52) U.S. Cl.
CPC ..... *G01C 21/3626* (2013.01); *G01C 21/3608* (2013.01); *G01C 21/3617* (2013.01)

(58) Field of Classification Search
CPC ............ G01C 21/3626; G01C 21/3608; G01C 21/3617
See application file for complete search history.

(56) References Cited

U.S. PATENT DOCUMENTS

| | | | | |
|---|---|---|---|---|
| 8,825,379 | B2 | 9/2014 | Schalk | |
| 9,073,505 | B2 | 7/2015 | Hosokawa et al. | |
| 9,082,239 | B2 * | 7/2015 | Ricci | G06F 21/00 |
| 9,208,619 | B1 | 12/2015 | Nerayoff et al. | |
| 9,405,967 | B2 * | 8/2016 | Samet | G06F 21/44 |
| 9,539,999 | B2 * | 1/2017 | Tseng | B60W 30/00 |
| 9,950,619 | B1 | 4/2018 | Chan et al. | |
| 10,048,079 | B2 * | 8/2018 | Suzuki | G01C 21/3407 |
| 10,228,256 | B2 * | 3/2019 | Singh | G01C 21/3484 |
| 10,949,886 | B2 * | 3/2021 | Tong | G06F 3/16 |
| 11,027,686 | B2 | 6/2021 | Kline et al. | |
| 11,142,039 | B2 * | 10/2021 | Rakshit | G06V 20/59 |

(Continued)

FOREIGN PATENT DOCUMENTS

| | | | | |
|---|---|---|---|---|
| DE | 102016010110 A1 * | 8/2016 | | G01C 21/3605 |
| EP | 2638533 A1 | 9/2013 | | |

(Continued)

OTHER PUBLICATIONS

Translation of German Patent (Year: 2025).*

(Continued)

*Primary Examiner* — Fadey S. Jabr
*Assistant Examiner* — Ashutosh Pande

(57) ABSTRACT

An example operation includes one or more of analyzing, by sensors in a vehicle, objects in the vehicle related to at least one occupant, a physical condition of the at least one occupant, and spoken words of the at least one occupant, determining a destination of the vehicle, based on the analyzing, and modifying a feature of the vehicle, based on the determining.

20 Claims, 25 Drawing Sheets

150

(56) References Cited

U.S. PATENT DOCUMENTS

| | | | | |
|---|---|---|---|---|
| 11,482,019 | B2 * | 10/2022 | Porta | G06V 40/20 |
| 11,634,163 | B2 | 4/2023 | Wang et al. | |
| 11,887,383 | B2 * | 1/2024 | Turcot | G06V 20/59 |
| 12,084,045 | B2 * | 9/2024 | Golston | B60W 50/0098 |
| 2007/0243854 | A1 | 10/2007 | Taki et al. | |
| 2009/0306989 | A1 * | 12/2009 | Kaji | G10L 15/22 704/270 |
| 2011/0093330 | A1 | 4/2011 | Burckart et al. | |
| 2016/0341567 | A1 * | 11/2016 | Delaruelle | B60N 2/0248 |
| 2018/0143033 | A1 | 5/2018 | Hu | |
| 2020/0018100 | A1 | 1/2020 | Aoi et al. | |
| 2020/0050858 | A1 * | 2/2020 | Jung | G06N 3/08 |
| 2020/0249046 | A1 * | 8/2020 | Mayberry | G01C 21/3617 |
| 2021/0261164 | A1 | 8/2021 | Ota et al. | |
| 2021/0333117 | A1 | 10/2021 | Urano et al. | |
| 2022/0357172 | A1 | 11/2022 | Lang et al. | |

FOREIGN PATENT DOCUMENTS

| | | | | |
|---|---|---|---|---|
| EP | 3616419 A1 | | 3/2020 | |
| GB | 2529997 B | * | 1/2019 | B60W 50/14 |

OTHER PUBLICATIONS

Bouchard, How Uber uses AI to serve you better, May 21, 2022, https://www.louisbouchard.ai/uber-deepeta/.

Lambert, Tesla will suggest travel destinations with in-car navigation, says Elon Musk, Jul. 9, 2019, https://electrek.co/2019/07/09/tesla-suggest-travel-destinations-in-car-navigation-elon-musk/.

* cited by examiner

150

250

260

270

300B

300C

300D

300E

400A

400C

400D

400E

500B

500F

VEHICLE MODIFICATIONS BASED ON A DETERMINED DESTINATION

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

One example embodiment provides a method that includes one or more of analyzing, by sensors in a vehicle, objects in the vehicle related to at least one occupant, a physical condition of the at least one occupant, and spoken words of the at least one occupant, determining a destination of the vehicle, based on the analyzing, and modifying a feature of the vehicle, based on the determining.

Another example embodiment provides a system that includes a memory communicably coupled to a processor, wherein the processor performs one or more of analyzes, by sensors in a vehicle, objects in the vehicle related to at least one occupant, a physical condition of the at least one occupant, and spoken words of the at least one occupant; determines a destination of the vehicle, based on the analyzation; and modifies a feature of the vehicle, based on the determination.

A further example embodiment provides a computer readable storage medium comprising instructions, that when read by a processor, cause the processor to perform one or more of analyzing, by sensors in a vehicle, objects in the vehicle related to at least one occupant, a physical condition of the at least one occupant, and spoken words of the at least one occupant, determining a destination of the vehicle, based on the analyzing, and modifying a feature of the vehicle, based on the determining.

DETAILED DESCRIPTION

Figure 1A:
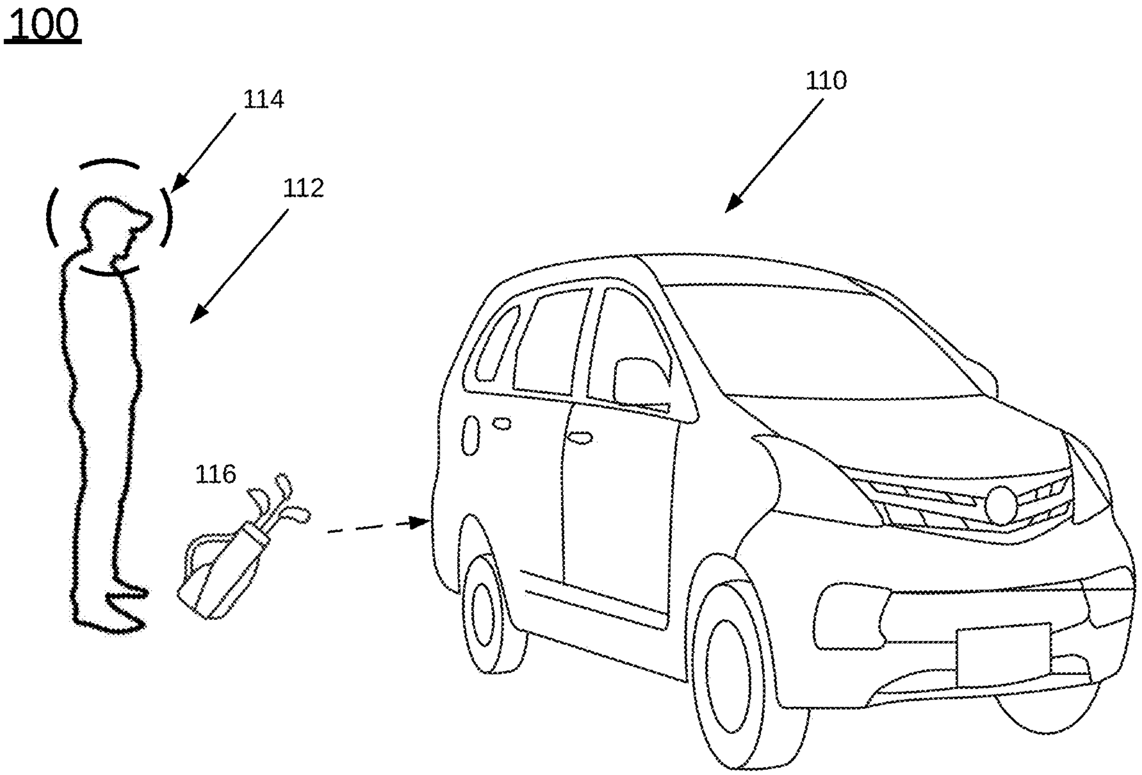
FIG. 1A illustrates an example of an occupant approaching a vehicle with carried objects which can be identified by the vehicle, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable media or a non-transitory computer readable storage medium.

Communications between the vehicle(s) and certain entities, such as remote servers, other vehicles and local computing devices (e.g., smartphones, personal computers, vehicle-embedded computers, etc.) may be sent and/or received and processed by one or more 'components' which may be hardware, firmware, software or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one example. Thus, appearances of the phrases "example embodiments," "in some embodiments," in other embodiments," or other similar language throughout this specification can all refer to the same embodiment. Thus, these embodiments may work in conjunction with any of the other embodiments, may not be functionally separate, and the described features, structures, or characteristics may be combined in any suitable manner in one or more embodiments. Although described in a particular manner, by example only, or more feature(s), element(s), and step(s) described herein may be utilized together and in various combinations, without exclusively, unless expressly indicated otherwise herein. In the diagrams, any connection between elements can permit one-way and/or two-way communication, even if the depicted connection is a one-way or two-way arrow. In the current solution, a vehicle may include one or more of cars, trucks, Internal Combustion Engine (ICE) vehicles, battery electric vehicle (BEV), e-Palettes, fuel cell bus, motorcycles, scooters, bicycles, boats, recreational vehicles, planes, drones, Unmanned Aerial Vehicle (UAV) and any object that may be used to transport people and or goods from one location to another. In the diagrams, any connection between elements can permit one-way and/or two-way communication, even if the depicted connection is a one-way or two-way arrow. In the current solution, a vehicle may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable media, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve crypto-currencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where Nis equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, GPS, maps, cameras, sensors and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

Examples embodiments enable a vehicle to determine one or more probable destinations based on data received from sensors on the vehicle and modifying features of the vehicle based on the destination. Vehicle sensors both inside and outside the vehicle body can detect various characteristics of the occupant(s) of the vehicle. In one example, cameras and microphones may perform a capture of an occupant disposition, such as facial recognition and speech interpretation of an occupant's speech. Other sensors or the same sensors can identify seat occupancy, occupant weight, occupant size, heart rate, breathing rate, temperature, and humidity. Additional sensor data can be accessed by pairing a vehicle with a smartphone or smartwatch operated by the occupant(s).

Receiving, and/or combining, analyzing, and interpreting vehicle sensor data may provide a vehicle computing system to consider a possible destination and extrapolate other possible intended destinations, and use that derived information to enable or modify vehicle features and functionality, enhancing the occupant's experience during vehicle travel. The occupant disposition, accessories worn and/or brought into the vehicle can provide a vehicle processing system and/or computing device to automatically adjust vehicle operations and other components and/or enable vehicle functionality without direct input from the occupant(s).

One example may include the vehicle application making a decision or prediction as to a probable destination of the vehicle based on data received by sensors on the vehicle. Once a likely destination has been identified, the vehicle prediction application may modify certain features of the vehicle based on the predicted destination(s). For example, sensors may identify a golf bag 116 (see FIG. 1A) being loaded into the trunk or other portion of the vehicle and a golf visor/hat 114 being worn or carried by the occupant and determine that the occupant's destination is likely to be the golf club based on a machine learning and/or artificial intelligence (AI) application being used in counterpart with the vehicle application. The vehicle 110 could then identify an optimal driving route, determine whether a stop(s) along the way is necessary, and activate a chair massage to prepare the occupant to play a round of golf. The vehicle 110 may also determine a stop for coffee and/or food is necessary based on a previous routine performed in the transport with the same occupant and logged in a transport/occupant profile which may have included a stop at the sports store to purchase golf balls, a stop at the market to purchase a sports drink, a stop at the gas station to purchase coffee and a snack, etc. In another example, the vehicle 110 could "learn" the occupant's routine and determine, based on a time-of-day, the occupant's accessories and water bottle, that the occupant is going for their daily run and could plot a course for a commonly visited local running park based on a previous amount of time the occupant was away from the vehicle, and/or the occupant's heart rate and perspiration when they returned to the vehicle 110, which is sensed by one or more vehicle sensors. Additionally, the vehicle could pre-order a coffee at a local coffee market after the end of the run to be ready on the occupant's commute home to reenergize the occupant since the occupant may appear drowsy from the exercise as detected by vehicle sensors.

In another example, sensors in and/or outside the vehicle may detect body temperature, heart rate, perspiration, and the presence of a gym bag, which causes the vehicle 110 to adjust the HVAC temperature and fan settings automatically and recommend a trip to a nearby grocery store for a sports drink or bottled water. The predictions may be performed by a separate application that monitors the sensor data on an ongoing basis and provides input to the activity determination application to modify a previous decision process as part of an artificial intelligence or machine learning process. In one example, vehicle modifications could also include dimming of the interior lights, adjustments of the seat positions, modifications to the infotainment audio levels, modifications to the cabin temperature, and seat heating/cooling/massaging. The decisions made by the activity determination application may be modified by the presence of new data received from the vehicle sensors and/or a previous history of data available to the vehicle stored in a temporary databank that can be retrieved to make the current modifications to the vehicle operations and/or destination(s).

In another example, the application can prioritize vehicle functionality based on identified categories, including urgency, safety, and demographics. For example, when the application determines that an urgency is high, such as due to the occupant having a quickened motion or spoken words indicating urgency. In that case, the performed and/or suggested actions may be minimal due to the detected urgency.

In another example, if there is a baby, small child, or older occupants in the vehicle, then safety may be prioritized instead of efficiency. The additional occupants may also create a modification to the vehicle destination decisions and order of destinations. The presence of a small child may negate the likelihood that a golf destination is going to be the next stop by the vehicle. The vehicle may determine that the small child being in the vehicle has a result of stopping at the child's grandparents' house prior to any additional vehicle stops. The modification application may enable a child song radio station to play and a stop at a favorite fast-food location prior to any golf related stops. The modified stop may also change the outcome of a normal stop at a gas station for beer, food or coffee and may cause the ordering of a coffee from the fast-food location instead since it would be counterproductive to stop at a gas station for coffee when the coffee is available at the fast-food stop. The modification of the stop may be considered a replacement stop since it satisfies one or more prioritized criteria (e.g., prioritized occupant) and then permits the originally intended final destination of the golf course (e.g., criteria being coffee, food, etc.). The remaining needed criteria once that stop is made may be reconsidered in a subsequent stop until all the criteria elements are satisfied (e.g., food, coffee, golf balls, etc.). Having additional occupants in the vehicle may cause machine learning decisions to be made which are different from initial predictions and decisions, however, all of the criteria elements may still be satisfied, just in a different order and/or via different locations depending on a priority. The child's food preferences may take priority over the adult occupant's food preferences, and thus the original plan to stop at the gas station for coffee and a granola bar is overwritten by the fast-food restaurant since the child always gets to go to the fast-food location on Saturday morning and the child's food desires take priority of the parent or guardian food desires.

In another example, the application can utilize a subscription model, where the occupant(s) may subscribe to a subscription-based vehicle modification. When synchronized with a smartphone calendar, the vehicle 110 may suggest destinations based on calendar event locations within a fixed time 'two-hour' window. Similarly, the vehicle 110 will automatically route to a work destination if departing from home between regular commute hours and Monday through Friday. Automatic navigation may also include a scheduled departure feature that adjusts cabin temperatures to align with the departure and charging schedules to ensure the vehicle is adequately charged while avoiding peak electricity rates. Additionally, a trip planner function will adjust destination routes to account for charging stops along the route and can automatically re-route to account for heavy traffic or to avoid tolls when configured accordingly.

FIG. 1A illustrates an example of an occupant approaching a vehicle with carried objects that can be identified by the vehicle, according to example embodiments. Referring to FIG. 1A, the example 100 includes a future or recent vehicle occupant, such as vehicle operator and/or owner, approaching a vehicle 110. As the occupant 112 approaches the vehicle 110, one or more vehicle sensors may identify the occupant 112 by a person detection operation using one or more sensors/cameras, etc. A proximity sensor on the vehicle may identify the occupant as being within a threshold distance of the vehicle 110. The occupant 112 may then be identified as having one or more objects present, such as worn object(s), such as a hat 114, a coat, a t-shirt, sweatshirt, pants, shorts, shoes, watch, etc. The presence of any one or more of those objects may indicate a future activity, such as walking, running, hiking, fishing, hunting, golfing, or other sports, etc. Additional objects may be identified by the sensors capturing images and comparing them to previous images and/or a databank of images for a match. The image matching process may be based on the databank being stored in the vehicle or a remote server that is being used as an image consideration reference by the vehicle. As an image is received by a camera or similar device on the vehicle, the image is sent to the remote databank by wireless communication to confirm via one or more image correlation matching processes that the objects in the image and to receive a result (i.e., golf bag, sports cap, etc.). The vehicle may then use that identifier as tag to make selections and also select content, such as golf courses for the navigation system and/or golf radio news, golf instruction, etc.

In this example, the occupant 112 has brought a golf bag of clubs 116, and whether or not they are being held or resting on the ground, the vehicle 110 will use one or more exterior and/or interior sensors affixed to the transport (not shown) to capture images and/or scan data of the occupant and those objects. Image recognition and related procedures known to those skilled in the art will compare the image data to known image data to identify a match and create a resulting identifier(s) related to the occupant.

As the occupant places the object(s) in the vehicle 116, additional processing may be performed to determine a type of object, a reference comparison to previous objects placed in the vehicle 110, a weight measurement may be conducted to identify a weight of the object and compare it to a likely weight of the object based on a weight sensor under the trunk space or on a seat inside the vehicle 110. The weight may be based on pounds or kilograms and may be taken by a scale located under a trunk space, a seat, etc. The weight may also be measured based on an impression measurement by the digital signal processing image capturing device that predicts the weight based on how it presses against the surface of vehicle seat. A processor in the vehicle may receive the weight measurement and compare the weight to known weights of the object identified. This can provide an additional level of confirmation that the bag is a golf bag that weighs 21 pounds similar to most golf bags which weigh about 20 pounds. The processor of the vehicle computing device may output a confirmation of the golf bag which can then be used by the navigation system to predict a next location now that the golf bag is identified. An analysis of the hat may also be performed to determine a type of hat (e.g., visor, ball cap, construction hat, winter hat, summer hat, etc.) based on the image data and the image comparison process. In one example, if the hat type matches a type of hat associated with a golf bag 116, then the certainty level the occupant is going golfing may be significantly higher than if the golf bag was just placed in the car. For example, a golf bag may be placed in a car and sensed by the vehicle sensors. This may create a default likelihood value of going golfing, such as 65 percent. The vehicle may require a certainty level of 80 percent prior to modifying a vehicle feature and/or routing the navigation to the golf course. The hat may be identified as a golf type of hat, and that may add 10 or 15 percent more certainty to the decision function. The day may be Saturday and that could add an additional 5 percent of certainty; the time of day could be before 2 μm and that could add an additional 5 percent certainty to the combined function value. As another example, if the time is after 7 pm, then the percentage of certainty is lower for the person to go golfing that day. All the values provided are merely for example purposes, and the values used in a certainty function may change or be varied.

Figure 1B:
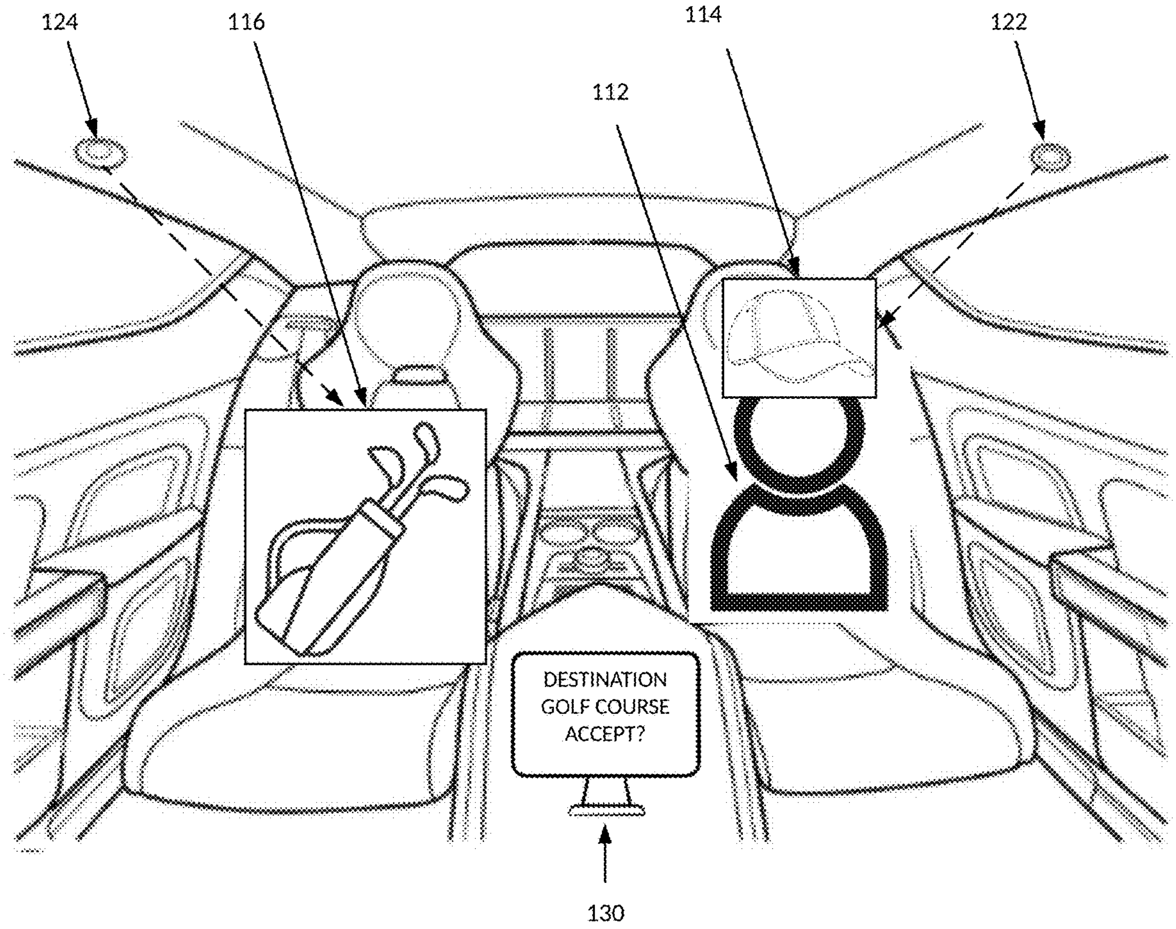
FIG. 1B illustrates a further example of an occupant inside a vehicle with present objects, according to example embodiments.

FIG. 1B illustrates a further example of an occupant inside a vehicle with present objects, according to example embodiments. Referring to FIG. 1B, the example configuration 150 demonstrates that the occupant 112 is inside the vehicle 110 with a ball cap on 114, which would suggest a future sporting event is likely to occur, such as running, hiking, biking, golfing, etc. The sensors 122/124 may capture images of the occupant 112 and the hat worn 114. The bag of golf clubs 116 may be in the back seat, trunk, front seat, etc. The fact that the bags were just placed in the vehicle vs. the bag being there for several vehicle uses may create a higher likelihood that the occupant is going golfing, such as by a margin of 10, 20, 30 percent, etc.

The evidence identified from the sensor data of the golf clubs 116 and the hat 114 being present together can elevate the machine learning function to create an even higher likelihood of going golfing, especially if they were placed in the vehicle at the same time. For example, the clubs being placed in the car may have a raw value of 65 percent certainty. The golf hat 114 being worn may have a raw value of 10 percent certainty. However, the fact that both objects are included in the same vehicle use event may cause the certainty function to weigh the presence of both objects higher by an additional margin of 5 percent each. Thus the raw combined value of 75 percent is now 85 percent. This additional weight may be referred to as a synergistic value.

The process of adding additional weights to a likelihood function or certainty value of two or more objects based on the combination of those objects being present in the vehicle 110 may be referred to as an increased synergistic value that is larger than the sum of the individual values. In this case, the raw values of the hat and golf clubs are 75 percent certainty, while the increased synergistic value (adding 5 percent to both objects) yields a grand total of 85 percent. This value is at the 85 percent certainty that is needed for the vehicle 110 to initiate a navigation suggestion and/or route to the golf course and/or to locations in lieu of the golf course to prepare for a round of golf by the occupant. The synergistic total may be required to ascertain an accurate prediction in the artificial intelligence (AI) analysis since the objects alone may never reach the required threshold of certainty to cause the vehicle to initiate a destination planning process.

The sensor data may ascertain the golf hat 114 is in the vehicle 110, which may have a value of 5 or 10, and that it is being worn currently, which may increase the value by an additional 5 points since the likelihood of its relevance currently is now higher than if it was just being present in the vehicle 110. Once the collection of objects in the vehicle 110 is identified, the correlations between the objects are identified; for example, a golf bag 116 may not correlate with a baby bottle or a hiking boot. However, a baseball cap or common cap may be associated with a golf bag which could increase and/or invoke the synergistic scoring factor to further increase the likelihood/criteria score necessary to make a navigation route decision by the vehicle 110. The correlation may be performed as a function to a stored set of data stored in a machine learning databank of a database. In the event that a decision is made to change a route and/or perform one or more vehicle actions, the vehicle processing unit/computing device may create a navigation route or suggested route 130 based on the machine learning data ascertained by the application applying the correlation function.

Example actions performed by the application may include modifying a current operational status of the HVAC system of the vehicle. If an occupant is identified to be traveling to work, the airflow must be planned accordingly to ensure comfort and to avoid sweating. The occupant may be finishing a golf game, in which case, the vehicle may be performing periodic cooling events where the vehicle is cooled around an estimated time when the occupant is to be finished to avoid a very warm vehicle on a hot day. The vehicle 110 may initiate an audio/video session to share information to improve a golf swing on the way to the golf course. This may be performed automatically to provide the occupant with entertainment relevant to the intended destination. The application may initiate any special promotions at the fast-food location where the vehicle is first going to route to save time for the occupant in deciding what to drink or eat. A coffee order may be initiated by the vehicle application and placed via wireless communication to a coffee location on the way to the golf course or on the way home since that routine is identified from a memory of the vehicle during route planning and previous stops along the way. When a child is present, the route taken to the grandparents' home may be a safer route to ensure safety for the small child as opposed to the fastest route. The vehicle may drive slower as well instead of the usual pace sought by the occupant. The occupant's personal calendar may be retrieved from memory to confirm one or more appointments prior to modifying a navigation route of the vehicle. The calendar may create a deduction in activity likelihood scoring when a schedule conflict is identified that would override the predicted activity of going golfing. For example, if the occupant is entering the vehicle with a golf hat and golf bag and the appointment in the digital records of the calendar identifies a different location, the application may then inquire as to whether the occupant is still planning to attend the appointment or head towards to golf course. The calendar can be used to affirm or reduce the chances of a particular outcome.

One example process may include analyzing, by sensors in the vehicle 110, objects in the vehicle related to at least one occupant, such as those brought into the vehicle by the occupant. The analyzing may also cause a physical condition of the at least one occupant to be evaluated, such as current vital signs, current health condition, personal disposition, etc. This process may include performing an infrared scan image of the person to identify a heat level of the person and translate the data by a processor of the transport into an estimated temperature. Also, the contours of the person can be analyzed for sweat. A sensor on the steering wheel can provide an estimate of a heart rate. Certain thresholds of any of the levels of the occupant which are measured may indicate stress or a need for immediate action to assist the occupant. If an occupant appears to be unfit for a predicted destination that may add to the level of stress experienced by the occupant, the vehicle may attempt to select another destination that can assist the occupant until the physical condition has changed. Any spoken words made by the at least one occupant may be analyzed to confirm the occupant's plans, such as a conversation with a friend to meet the friend at the golf course or the store prior to going to a next destination. The vehicle application may then determine a destination of the vehicle, based on the analyzing, and modifying any one or more controls or features of the vehicle as a result of the decision to accommodate the decision to modify or create a new destination.

Considerations for modifying the destination and/or the controls of the vehicle may include identifying a time of week and time of day, and confirming the objects in the vehicle and one or more of the physical condition and the spoken words of the at least one occupant are related to the destination based on one or more of the time of week and the time of day. Any previous instances of the vehicle traveling to a known destination prior to the current destination selection operation may enable the decision process to select a destination based on the previously known destinations. All of the criteria available for making a decision may be analyzed as part of a weighted function value which, when above or equal to a particular score, invokes an action by the application such as creating a route, alternative routes, initiating functions of the vehicle, etc.

The process may also include identifying one or more additional occupants and analyzing one or more of objects in the vehicle adjacent to the one or more additional occupants and an age of the one or more additional occupants. In the example of an additional occupant and additional golf bags, the entire set of occupants may be headed to the golf course, and the certainty of the vehicle application destination prediction will increase. If the additional occupant has a tennis racquet and the golf club has a tennis court, the result may be to navigate to the same golf course destination. When another occupant has brought other objects unrelated to the event identified then the likelihood of an intermediate stop or an alternative destination and other functions of the vehicle operation may increase.

The analyzing of objects in the vehicle may include determining types of objects, locations of the objects within the vehicle interior area, and times when the objects were placed in the vehicle. In one example, the modifying of a feature of the vehicle may include initiating an information session that performs one or more of displaying information and playing audio inside the vehicle. The audio may be related to the destination and/or one or more activities associated with the destination. One example may include playing an instructional video related to the destination location. The process may also include receiving occupant device sensor data from an occupant device inside the vehicle, such as a smartphone, smartwatch or other device and determining the physical condition of the at least one occupant based on the received occupant device data, such as vital data or related health data. The process may also include identifying one or more additional occupants and determining one or more additional destinations based on the one or more additional occupants.

In one embodiment, as the occupant approaches the vehicle with objects, the vehicle's external and internal sensors actively identify the objects and their potential locations inside the vehicle. For example, if the occupant approaches with grocery bags, the system suggests or automatically prepares the trunk space for storage. If a guitar case is identified, the back seat might be suggested, allowing the user to optimize space while ensuring the safety and integrity of their belongings. This organizer system, based on AI and sensor data, provides feedback to the user regarding optimal object placement, ensuring both convenience and safety during travels.

In one embodiment, the personal comfort of the occupants are attended to by the instant solution, based on their attire and carried objects. As the vehicle's sensors recognize the type of clothing the occupant is wearing (like a heavy coat in winter), the internal vehicle environment can be automatically adjusted to cater to the anticipated comfort level of the occupant. For example, if someone is identified wearing heavy winter gear, the car might preemptively raise the internal temperature or start the seat warmer. Conversely, summer attire could trigger a cooler internal temperature or even suggest sunroof adjustments for ventilation.

In one embodiment, the vehicle uses its sensors not just to detect objects but also to help occupants plan social activities. For example, if the vehicle detects tennis rackets, it could suggest nearby courts or upcoming local matches. If it senses a picnic basket, it might recommend local parks or scenic spots, or even offer to play suitable picnic-themed music. This dynamic social planner system would connect to local databases and event calendars, allowing the vehicle to provide real-time suggestions to the occupants based on the objects they bring into the car, effectively making the car a dynamic participant in their social planning.

In one embodiment, the vehicle is equipped with an array of sensors strategically placed to comprehensively monitor the internal environment. These sensors are designed to detect and analyze objects related to the occupants. This could entail recognizing everyday items like bags, equipment, or clothing, suggesting activities or destinations. For example, if the sensors detect a bag of golf clubs, it might infer a trip to a golf course. In addition to objects, the sensors also assess the physical condition of the occupants. Such an assessment could involve determining their current state of alertness, stress level, or even health conditions. This might involve thermal sensors to check body temperature, seat sensors to gauge posture, or other biometric monitoring systems. The purpose here is to ensure the well-being of the occupants and make any necessary adjustments to the vehicle's systems or even suggest breaks if fatigue is detected.

Furthermore, the vehicle is fitted with audio detection capabilities, enabling it to pick up and interpret spoken words of the occupants. This feature can function similar to voice assistants found in smart devices, but with a specific focus on understanding context or direct commands related to the vehicle's journey. For example, if an occupant casually mentions going to a beach, the system registers this as a potential destination. Once the vehicle has gathered this data, advanced onboard functionality or AI systems process the information to determine the vehicle's destination. It would correlate the detected objects, physical conditions, and spoken words to map out probable destinations. For example, detecting a swimsuit, sensing an excited demeanor, and picking up conversations about swimming would strongly suggest a beach or pool destination.

The "modifying a feature of the vehicle" can encompass a wide range of actions. If the vehicle deduces a long journey ahead, it might adjust the seats for optimum comfort, set the climate control to a more sustained setting, or even suggest a playlist suited for long drives. Essentially, the vehicle becomes a responsive entity, always adapting to ensure the best experience for its occupants based on the inferred or detected needs and destinations.

In one embodiment, the vehicle is equipped with an internal clock or has access to real-time temporal data. This can be achieved through integration with satellite systems, like GPS, or by syncing with cloud-based servers that provide accurate time and date information.

Upon initializing its destination determination process, the vehicle first identifies the current time of week and time of day. This information is vital because people's activities and destinations often follow patterns dictated by the day of the week and the time of day. For example, on weekdays during early morning hours, a common destination might be a workplace, while on Saturday evenings, it might be a restaurant or entertainment venue.

Once the time data is acquired, the vehicle uses this as an additional layer of context to interpret the other sensory information it gathers. When analyzing objects in the vehicle, the physical condition of the occupants, and the spoken words, the vehicle cross-references this data with the identified time to confirm if they align with typical patterns for that specific time slot. Using our earlier example, if it's a weekday morning, and the vehicle senses a briefcase and hears the occupant mention a meeting, it would have a high confidence in predicting a workplace destination. Conversely, if these same cues were detected late on a Sunday evening, the system might question this deduction and look for additional clues or ask the occupant for clarification such as playing a text-to-voice message over the vehicle's speakers.

In one embodiment, the vehicle is equipped with advanced sensing technology that doesn't just focus on the driver or a single occupant. These sensors might include cameras, infrared detectors, and pressure or weight sensors in the seating areas, allowing the vehicle to ascertain the presence of more than one person inside. Upon detecting multiple occupants, the system activates a distinct analytical protocol that accounts for this multiplicity. They system analyzes objects adjacent to these additional occupants. Such analysis can provide vital contextual clues about the passengers and their intentions or needs. For example, if the sensors detect a child seat next to an additional occupant, it can infer the presence of a child. Similarly, if the vehicle's cameras recognize toys or school bags, the system might deduce that the destination could be related to child-oriented activities or locales, such as schools, parks, or recreational areas.

Furthermore, the vehicle's sensors are sophisticated enough to make educated estimates about the age of the additional occupants. This could be achieved through facial recognition technology that analyzes facial features, skin elasticity, height, and other age-related indicators. Understanding the age of passengers can offer profound insights into the potential destination or the needs of those inside the vehicle. For example, detecting a group of teenagers might suggest destinations like a cinema, a mall, or a school, while the presence of elderly individuals might indicate visits to healthcare facilities, community centers, or specific recreational areas catering to older citizens.

In one embodiment, the vehicle's sensors determine the types of objects present. This might involve a combination of cameras, capable of optical recognition, and advanced sensors that can determine an object's material or composition. For example, recognizing an umbrella might suggest the occupant anticipates rain, while detecting a suitcase could indicate travel plans. The system could recognize a wide array of everyday items and associate them with activities, destinations, or needs. The location of the objects within the vehicle is also used by the system, as where an item is placed can provide additional context. Items placed on the passenger seat, for example, might be of immediate importance or use, while those in the trunk might be related to long-term plans or destinations that are not the immediate next stop. The vehicle's sensors would have spatial awareness, likely supported by internal cameras and possibly complemented by proximity sensors, to determine where within the vehicle an object is located. A temporal element is introduced by understanding when the objects were placed inside the vehicle. For this, the vehicle provides a continuous monitoring system or event log, registering when doors open and close and correlating that with detected object movements. For example, if a shopping bag was placed in the car two days ago, it might not be as relevant for determining today's destination as a laptop bag placed in the car that morning. Such a feature implies that the vehicle's system has some memory or data storage capability to keep track of these events over time, such as in memory in the vehicle that may be associated with a processor executing the full or partial portion of the instant solution.

Modern vehicles often come equipped with dashboard displays or infotainment systems. Using these interfaces, the vehicle can showcase relevant information based on the analysis from functionality disclosed herein. For example, if the vehicle determines, based on objects and conditions, that the occupant might be headed to a beach, it could display the current weather at the nearest beach, or perhaps tide timings. If the occupant's physical condition suggests they might be tired, the system could display nearby rest stops or coffee shops. The vehicle can utilize its audio system to communicate verbally with the occupant. Using text-to-speech capabilities, the car might verbally suggest destinations or provide insights like, "You seem tired. Would you like directions to the nearest rest area?" or "Based on the golf clubs in the trunk and the current time, would you like to book a tee time at the nearby golf course?"

In one embodiment, the vehicle integrates its sensors and analysis modules with its infotainment system. The software is designed to translate determinations into actionable suggestions or information snippets, which are then conveyed to the occupant. Seamless integration between the car's detection, analysis, and feedback systems is paramount.

Modern electronic devices, especially smartphones, smartwatches, and fitness trackers, are equipped with a plethora of sensors. These can monitor and record data like heart rate, body temperature, step count, and more. To facilitate the transfer of this data to the vehicle, the vehicle's infotainment or onboard computer system supports wireless communication protocols like Bluetooth or Wi-Fi. Once the occupant's device is paired with the vehicle, the car accesses and retrieves this sensor data in real-time or access stored logs from the device. With the acquired data, the vehicle can make more informed conclusions about the occupant's physical state. For example, a raised heart rate and elevated body temperature might suggest that the occupant has just exercised. If combined with previous determinations like time of day and objects in the car (e.g., gym bag), the vehicle could infer the occupant is returning from a workout. A reduced heart rate and lack of movement (from an accelerometer) could indicate the occupant is asleep or feeling unwell. The vehicle's system is equipped with software capable of interpreting data from common personal devices. This involves working with device manufacturers or utilizing open API frameworks to ensure compatibility and seamless data transfer. Data privacy and security measures would also be paramount, as the system handles potentially sensitive health and personal data. Encryption during data transfer and ensuring data is used exclusively for the vehicle's analytical processes without being stored would address some of these concerns.

To ascertain the presence of more than one occupant, the vehicle employs multiple techniques, such as weight-sensitive seats detecting the presence of a passenger, infrared sensors also determine body heat, suggesting a living occupant. Cameras inside the car, equipped with facial recognition software, identify additional passengers and, over time, recognize frequent occupants, understanding their common destinations or preferences. Interior microphones detect multiple voices or sounds, implying the presence of additional passengers.

Once other passengers are identified, the system works on determining a suitable destination for the collective group. For recognized passengers (like family members), the system access stored preference profiles in memory local to the vehicle and/or data obtained from remote servers. If the system identifies a child, for example, it might suggest a park or an ice cream shop. For a group of recognized adult friends, perhaps a popular restaurant or cinema. The system may also actively seek input, audibly asking, "Where would the group like to go?" and process spoken responses. The system might cross-reference known data points. If it's a weekend afternoon, the car identifies a parent and child, and there's a soccer ball in the car, it might suggest driving to a nearby soccer field.

In one embodiment, the vehicle accesses sophisticated interior sensors (cameras, microphones, weight sensors, etc.), advanced data processing capabilities, and a software system capable of data integration, analysis, and machine learning. Machine learning is crucial as it allows the system to continuously refine its understanding and predictions based on accumulated data and feedback.

Flow diagrams depicted herein, such as FIG. 2C, FIG. 2D, FIG. 2E, and FIG. 2F, are separate examples but may be the same or different embodiments. Any of the operations in one flow diagram could be adopted and shared with another flow diagram. No example operation is intended to limit the subject matter of any embodiment or corresponding claim.

It is important to note that all the flow diagrams and corresponding processes derived from FIG. 1A, FIG. 1B, FIG. 2C, FIG. 2D, FIG. 2E, and FIG. 2F may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
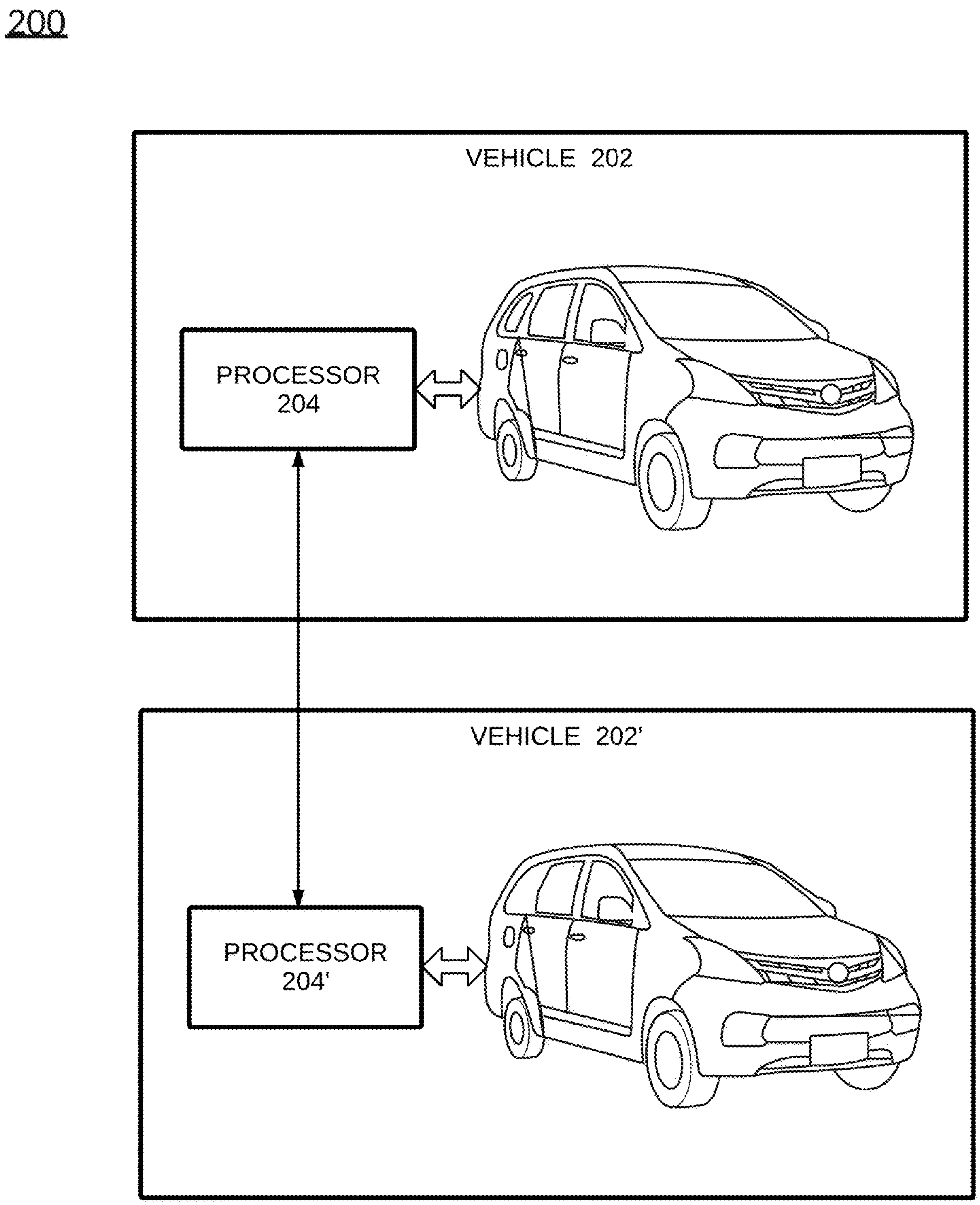
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
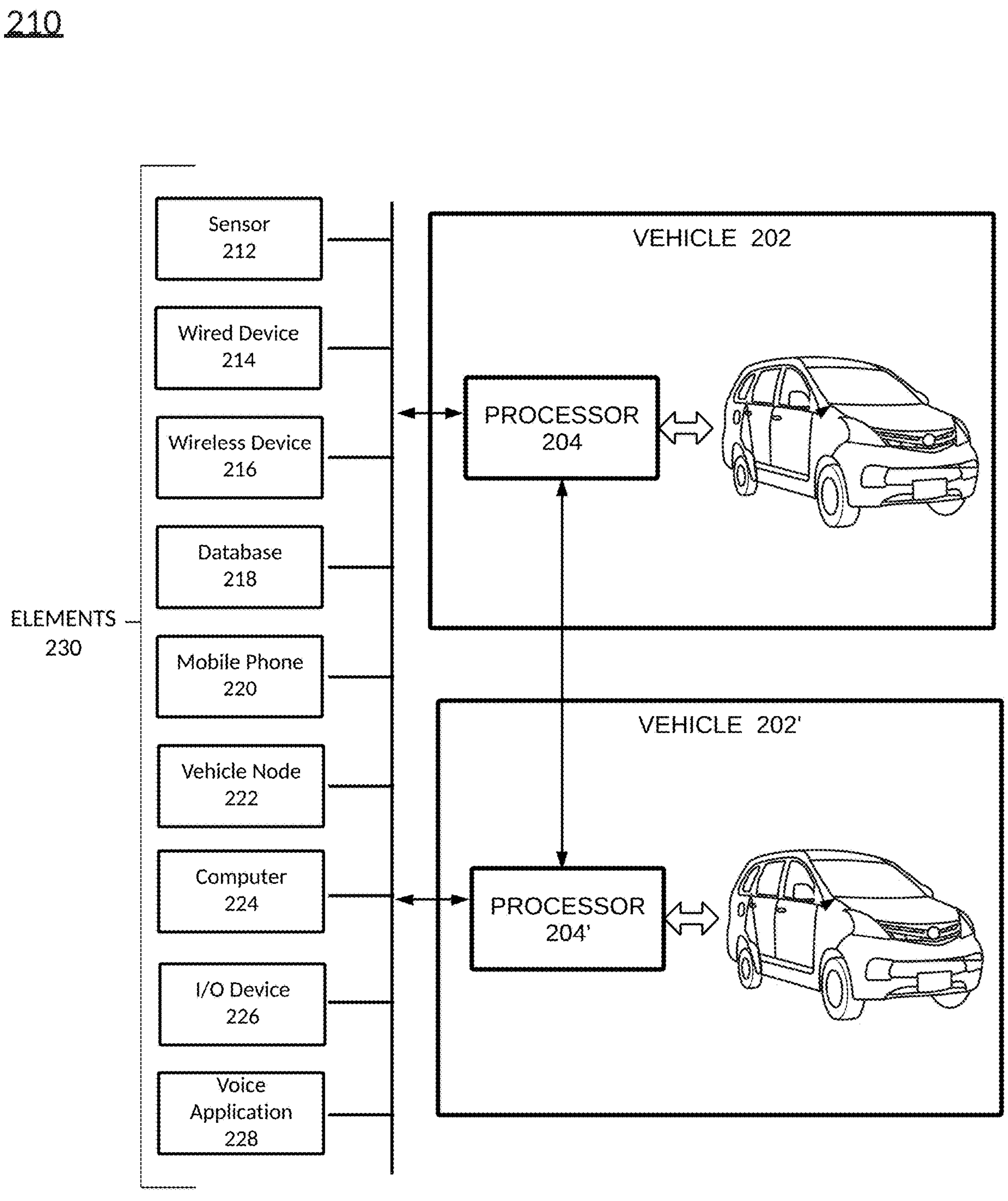
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, I/O device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
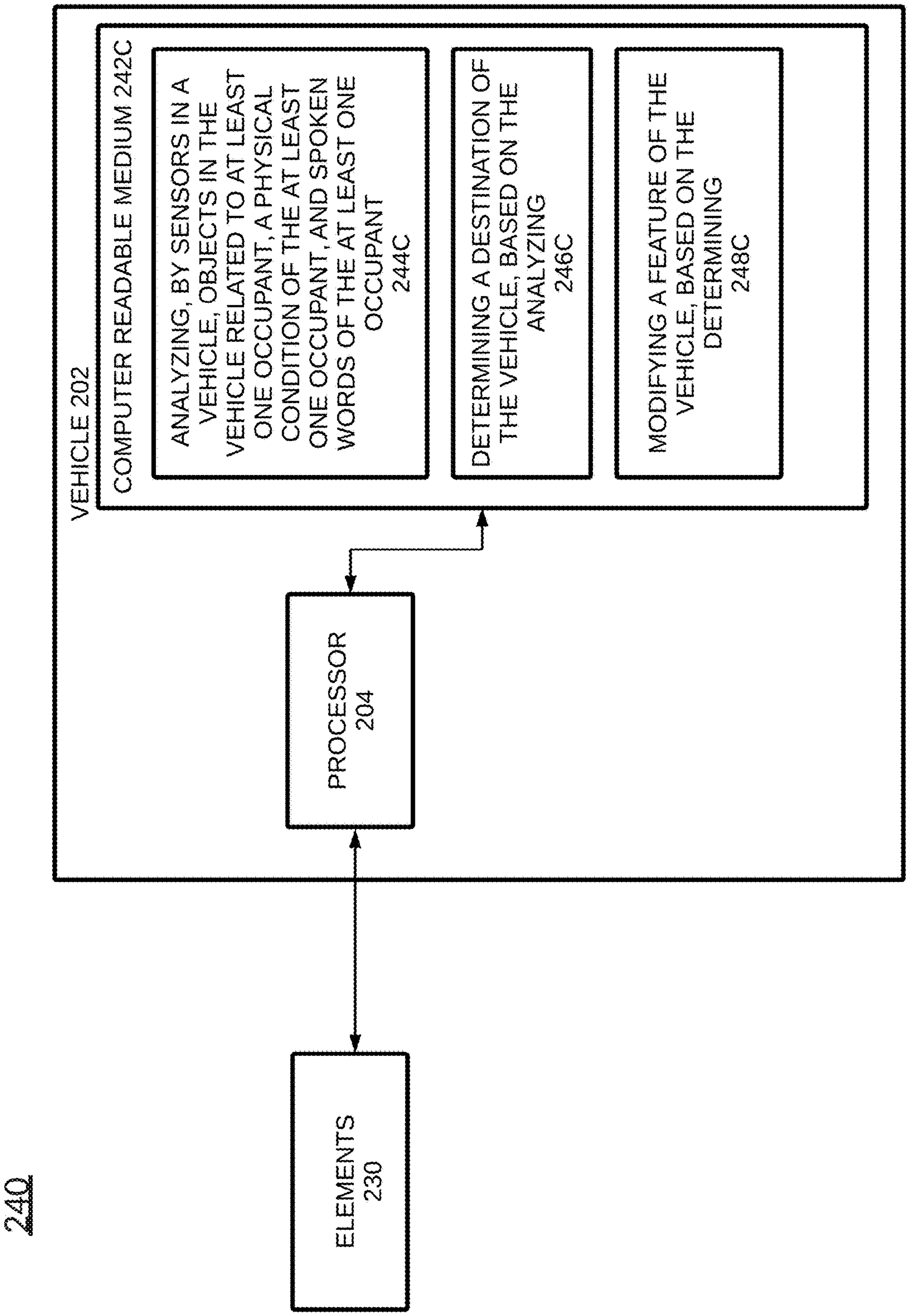
FIG. 2C illustrates yet another vehicle network diagram, according to example embodiments.

FIG. 2C illustrates yet another vehicle network diagram 240, according to example embodiments. The network comprises elements including a vehicle 202, a processor 204, and a non-transitory computer readable media 242C. The processor 204 is communicably coupled to the computer readable media 242C and elements 230 (which were depicted in FIG. 2B). The vehicle 202 could be a vehicle, server, or any device with a processor and memory.

The processor 204 performs one or more of analyzing, by sensors in a vehicle, objects in the vehicle related to at least one occupant, a physical condition of the at least one occupant, and spoken words of the at least one occupant 244C, determining a destination of the vehicle, based on the analyzing 246C and modifying a feature of the vehicle, based on the determining 248C.

Figure 2D:
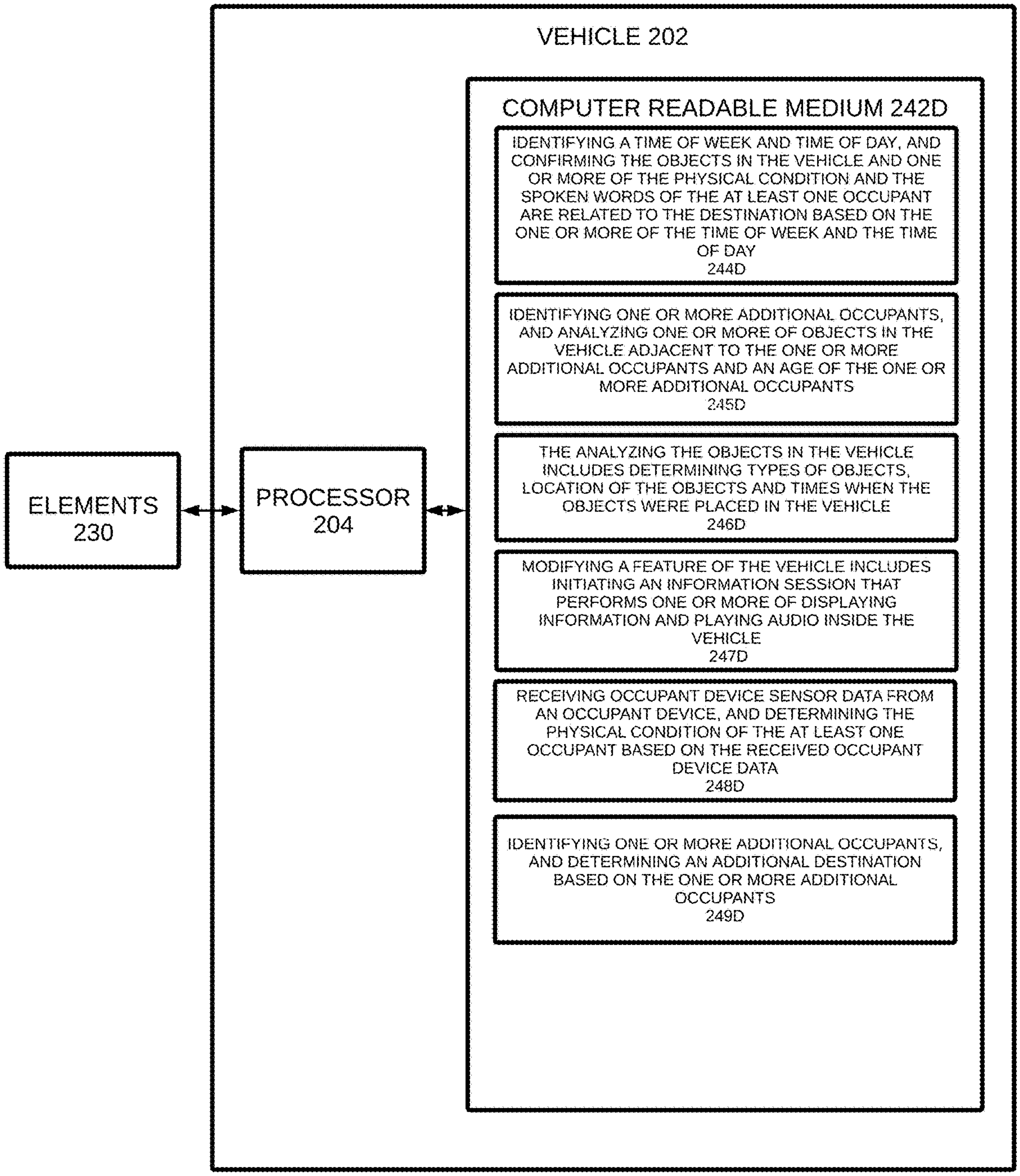
FIG. 2D illustrates a further vehicle network diagram, according to example embodiments.

FIG. 2D illustrates a further vehicle network diagram 250, according to example embodiments. The network comprises elements including a vehicle 202 a processor 204, and a non-transitory computer readable media 242D. The processor 204 is communicably coupled to the computer readable media 242D and elements 230 (which were depicted in FIG. 2B). The vehicle 202 could be a vehicle, server or any device with a processor and memory.

The processor 204 performs one or more of identifying a time of week and time of day, and confirming the objects in the vehicle and one or more of the physical condition and the spoken words of the at least one occupant are related to the destination based on the one or more of the time of week and the time of day 244D, identifying one or more additional occupants, and analyzing one or more of objects in the vehicle adjacent to the one or more additional occupants and an age of the one or more additional occupants 245D, analyzing the objects in the vehicle by determining types of objects, location of the objects and times when the objects were placed in the vehicle 246D, modifying a feature of the vehicle by initiating an information session that performs one or more of displaying information and playing audio inside the vehicle 247D, receiving occupant device sensor data from an occupant device, and determining the physical condition of the at least one occupant based on the received occupant device data 248D, and identifying one or more additional occupants, and determining an additional destination based on the one or more additional occupants 249D.

While this example describes in detail only one vehicle 202, multiple such nodes may be connected to the blockchain 206. It should be understood that the vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 could be a vehicle, server or any device with a processor and memory.

The processor 204 performs one or more of receiving a confirmation of an event from one or more elements described or depicted herein, wherein the confirmation comprises a blockchain consensus between peers represented by any of the elements 244E and executing a smart contract to record the confirmation on a blockchain-based on the blockchain consensus 246E. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer readable media may fully or partially reside in the interior or exterior of the vehicles. The steps or features stored in the computer readable media may be fully or partially performed by any of the processors and/or elements in any order. Additionally, one or more steps or features may be added, omitted, combined, performed at a later time, etc.

Figure 2E:
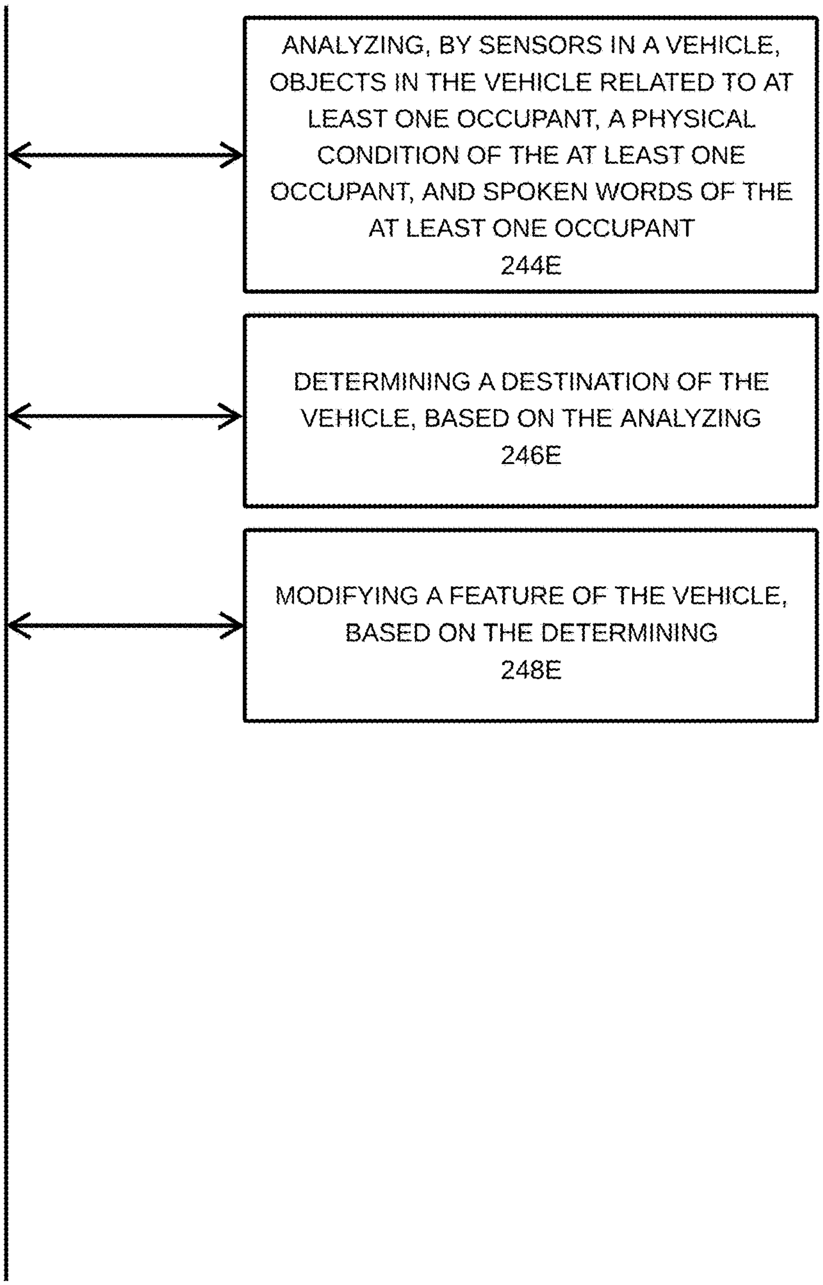
FIG. 2E illustrates a flow diagram, according to example embodiments.

FIG. 2E illustrates a flow diagram 260, according to example embodiments. Referring to FIG. 2E, the process includes analyzing, by sensors in a vehicle, objects in the vehicle related to at least one occupant, a physical condition of the at least one occupant, and spoken words of the at least one occupant 244E, determining a destination of the vehicle, based on the analyzing 246E and modifying a feature of the vehicle, based on the determining 248E.

Figure 2F:
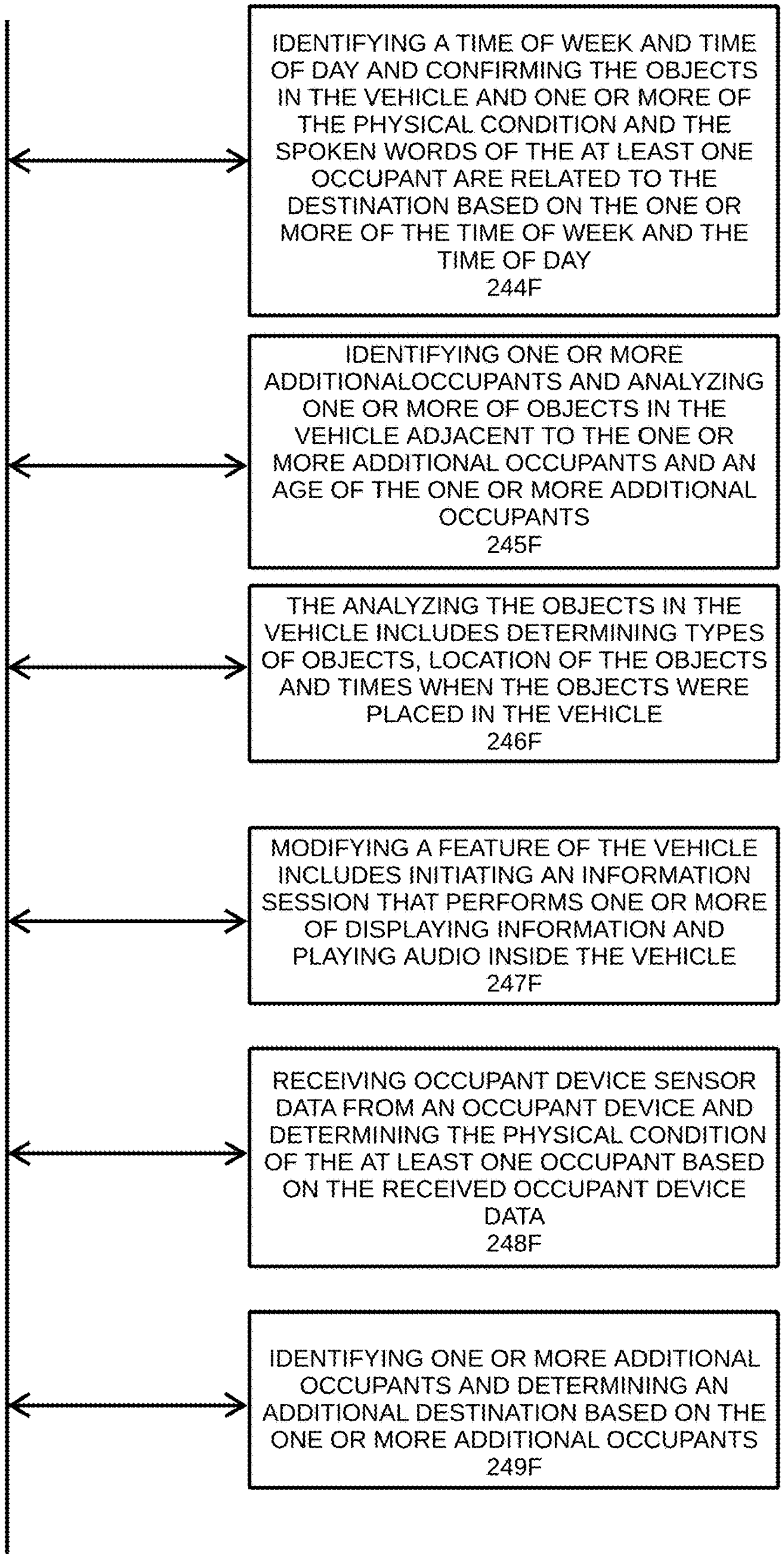
FIG. 2F illustrates another flow diagram, according to example embodiments.

FIG. 2F illustrates another flow diagram 270, according to example embodiments. Referring to FIG. 2F, the process includes identifying a time of week and time of day, and confirming the objects in the vehicle and one or more of the physical condition and the spoken words of the at least one occupant are related to the destination based on the one or more of the time of week and the time of day 244F, identifying one or more additional occupants, and analyzing one or more of objects in the vehicle adjacent to the one or more additional occupants and an age of the one or more additional occupants 245F, the analyzing the objects in the vehicle comprises determining types of objects, location of the objects and times when the objects were placed in the vehicle 246F, the modifying a feature of the vehicle comprises initiating an information session that performs one or more of displaying information and playing audio inside the vehicle 247F, receiving occupant device sensor data from an occupant device, and determining the physical condition of the at least one occupant based on the received occupant device data 248F, identifying one or more additional occupants, and determining an additional destination based on the one or more additional occupants 249F.

Figure 3A:
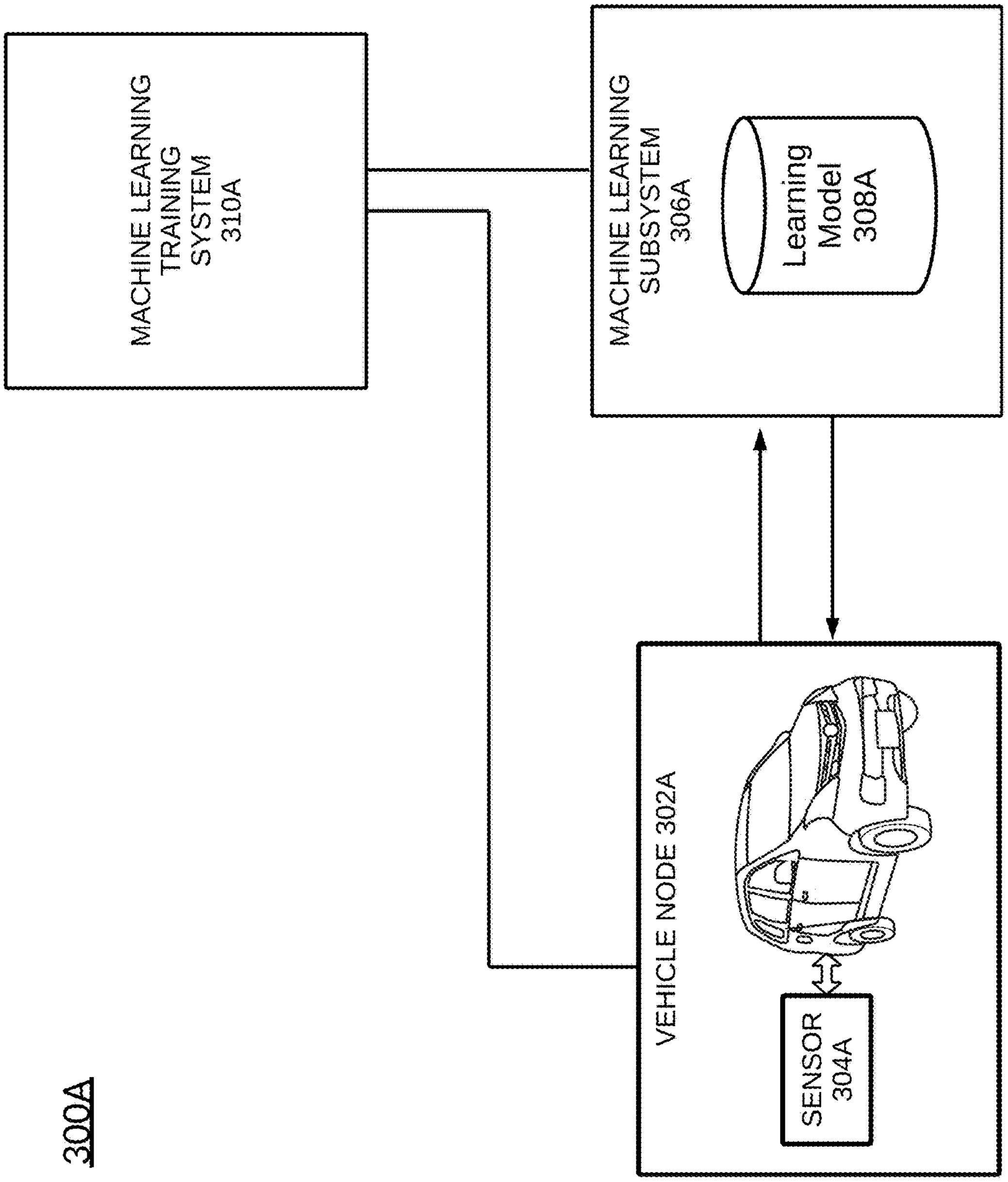
FIG. 3A illustrates a machine learning network diagram, according to example embodiments.

Referring now to FIG. 3A, a diagram depicting a machine learning vehicle network diagram 300A. The machine learning subsystem 306A contains a learning model 308A, which is an artifact created by a machine learning training system 310A that generates predictions by finding patterns in one or more training data sets. In some embodiments, the machine learning subsystem 306A resides in the vehicle node 302A. An artifact is used to describe an output created by a training process, such as a checkpoint, a file, or a model. In other embodiments, the machine learning subsystem 306A resides outside of the vehicle node 302A.

The vehicle 302A sends data from the one or more sensors 304A to the machine learning subsystem 306A. The machine learning subsystem 306A provides the one or more sensor 304A data to the learning model 308A, which returns one or more predictions. The machine learning subsystem 306A sends one or more instructions to the vehicle 302A based on the predictions from the learning model 308A.

In a further embodiment, the vehicle 302A may send the one or more sensor 304A data to the machine learning training system 310A. In yet another example, the machine learning subsystem 306A may send the sensor 304A data to the machine learning subsystem 306A. One or more of the applications, features, steps, solutions, etc., described and/or depicted herein may utilize the machine learning network 400 as described herein.

The example embodiments may communicate with a host platform 320, as shown in the examples of FIGS. 3B-3E. The system 300B may be hosted by or otherwise communicate with the host platform 320 shown in FIGS. 3B-3E. That is, the methods, systems, and processes described herein may interact with the processes and systems that are shown in the examples shown and described in FIGS. 3B-3E.

Figure 3B:
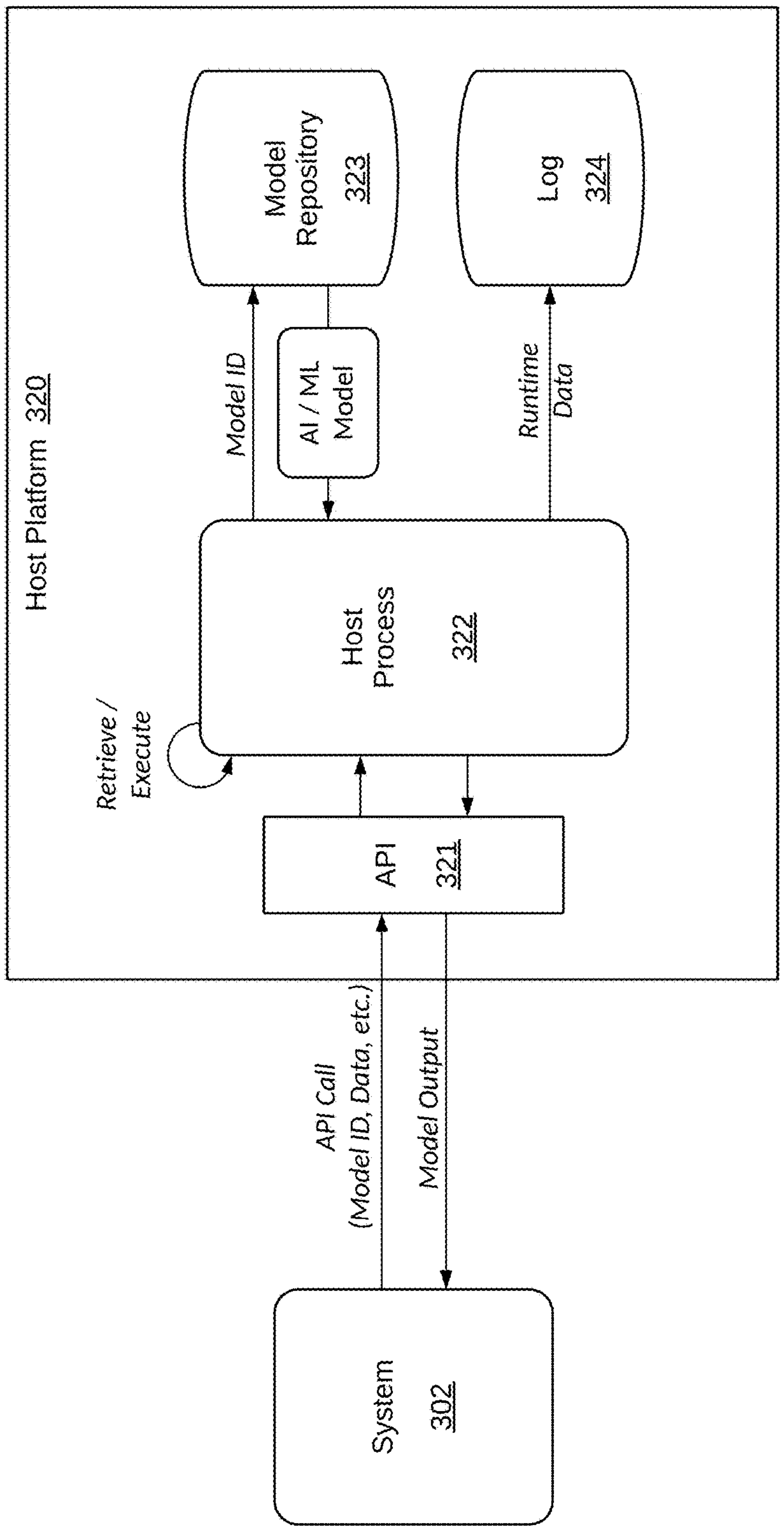
FIG. 3B illustrates another machine learning network diagram, according to example embodiments.

For example, FIG. 3B illustrates a process 300B of executing a machine learning model via the host platform 320. The host platform 320 may host a process 322 within a live runtime environment that is accessible to other software programs, applications, and the like, via a network such as the Internet. Here, the host process 322 may have a URL, endpoint, API, etc., which is publicly available on the Internet.

In this example, the host process 322 may control access to and execution of models that are stored within a model repository 323. For example, the models may include artificial intelligence (AI) models, machine learning models, neural networks, or the like. The system 300B may trigger the execution of a model from the model repository 323 via submission of a call to an application programming interface (API) 321 of the host process 322. The request may include an identifier of a model or models to be executed, a payload of data (e.g., to be input to the model during execution), and the like. The host process 322 may receive the call from the system 300B and retrieve the corresponding model from the model repository 323, deploy the model within a live runtime environment, execute the model on the input data, and return a result of the execution to the system 302. The result of the execution may include an output result from the execution of the model.

In some embodiments, the system 300B may provide feedback from the output provided by the model. For example, a user may input a confirmation that the prediction output by the model is correct or provide a notification that the model is incorrect. This information may be added to the results of execution and stored within a log 324. The log data may include an identifier of the input, an identifier of the output, an identifier of the model used, and feedback from the recipient. This information may be used to subsequently retrain the model, for example, using the model development environment shown in the example of FIG. 3C.

In one embodiment, the host process 322 may include Generative AI (GenAI), which may be used by the instant solution in the transformation of data. Vehicles may be equipped with diverse sensors, cameras, radars, and LIDARs, which collect a vast array of data, such as images, speed readings, GPS data, and acceleration metrics. However, raw data, once acquired, undergoes preprocessing that may involve normalization, anonymization, missing value imputation, or noise reduction to allow the data to be further used effectively.

The GenAI may execute data augmentation following the preprocessing of the data. Due to the limitation of datasets in capturing the vast complexity of real-world vehicle scenarios, augmentation tools are employed to expand the dataset. This might involve image-specific transformations like rotations, translations, or brightness adjustments. For non-image data, techniques like jittering can be used to introduce synthetic noise, simulating a broader set of conditions.

In the instant solution, data generation may be then performed on the data. Tools like Generative Adversarial Networks (GANs) and Variational Autoencoders (VAEs) are trained on existing datasets to generate new, plausible data samples. For example, GANs might be tasked with crafting images showcasing vehicles in uncharted conditions or from unique perspectives. As another example, the synthesis of sensor data may be performed to model and create synthetic readings for such scenarios, enabling thorough system testing without actual physical encounters.

A critical step in the use of GenAI, given the safety-critical nature of vehicles, is validation. This validation might include the output data being compared with real-world datasets or using specialized tools like a GAN's discriminator to gauge the realism of the crafted samples.

Figure 3C:
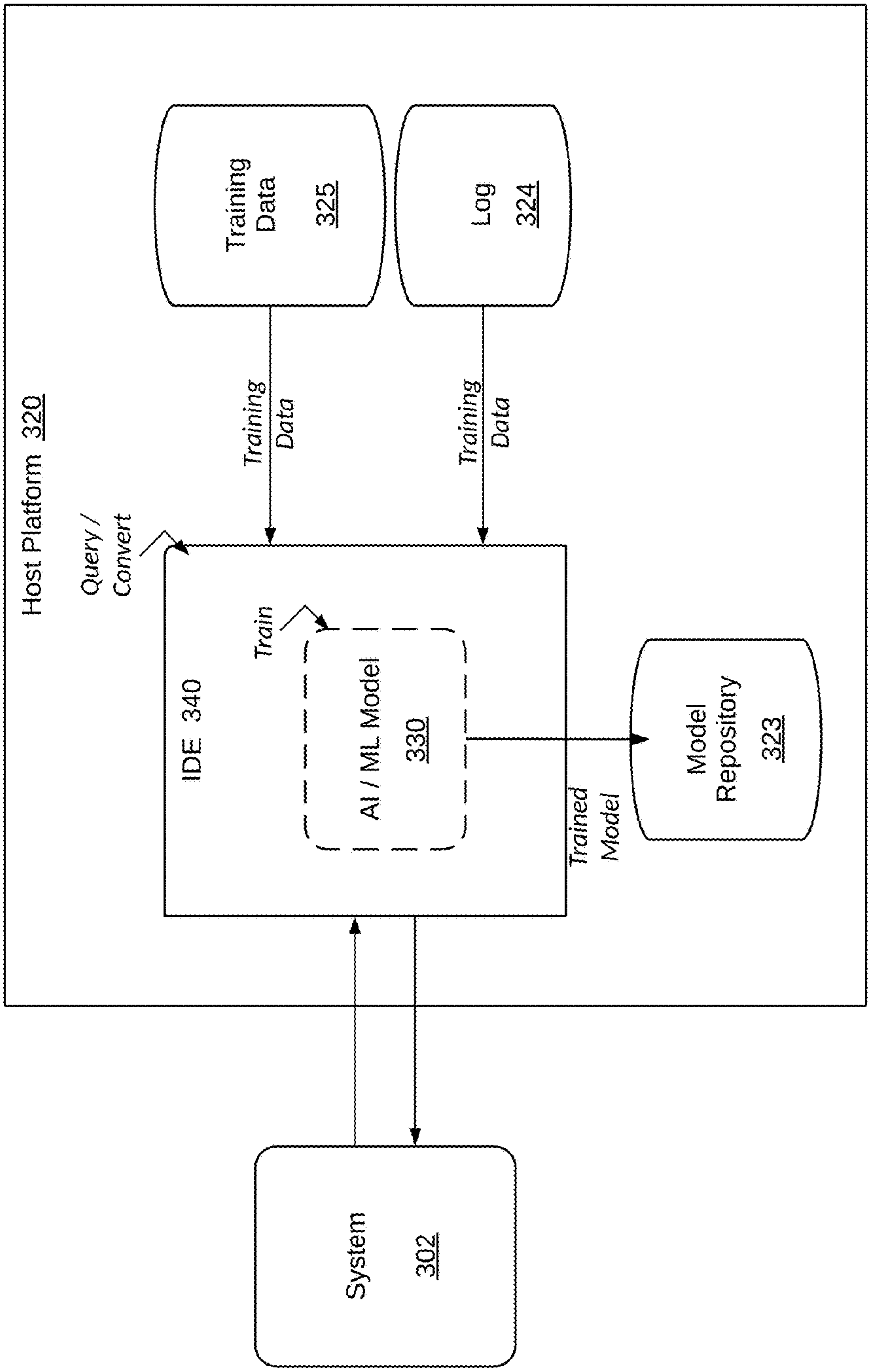
FIG. 3C illustrates yet another machine learning network diagram, according to example embodiments.

FIG. 3C illustrates a process 300C of training a machine learning model 330 according to example embodiments. Referring to FIG. 3C, the host platform 320 may host an integrated development environment (IDE) 340 where machine learning models, AI models, and the like may be developed, trained, retrained, and the like. In this example, the IDE 340 may include a software application with a user interface accessible by the system 302. For example, the IDE 340 may be embodied as a web application that can be accessed by a device at a network address, URL, etc. As another example, the IDE 340 may be locally or remotely installed on a computing device used by a user.

The system 300C may be used to design a model (via a user interface of the IDE), such as a machine learning model, etc. The model can then be executed/trained based on the training data established via the user interface. For example, the user interface may be used to build a new model. The training data for training such a new model may be provided from a training data store 325, which includes training samples from the web, from customers, and the like. Here, the model is executed on the training data via the host platform 320 to generate a result. The execution of the model causes the model to learn based on the input training data. When the model is fully trained, it may be stored within the model repository 323 via the IDE 340, or the like.

As another example, the IDE 340 may be used to retrain an existing model. Here, the training process may use executional results previously generated/output by the model 330 (including any feedback, etc.) to retrain the model 330. For example, predicted outputs that are identified as accurate, best, good, etc., may be distinguished from outputs that are inaccurate, incorrect, bad, etc. One or more of these types of outputs can be identified and used for retraining the model to help the model provide better outputs.

Figure 3D:
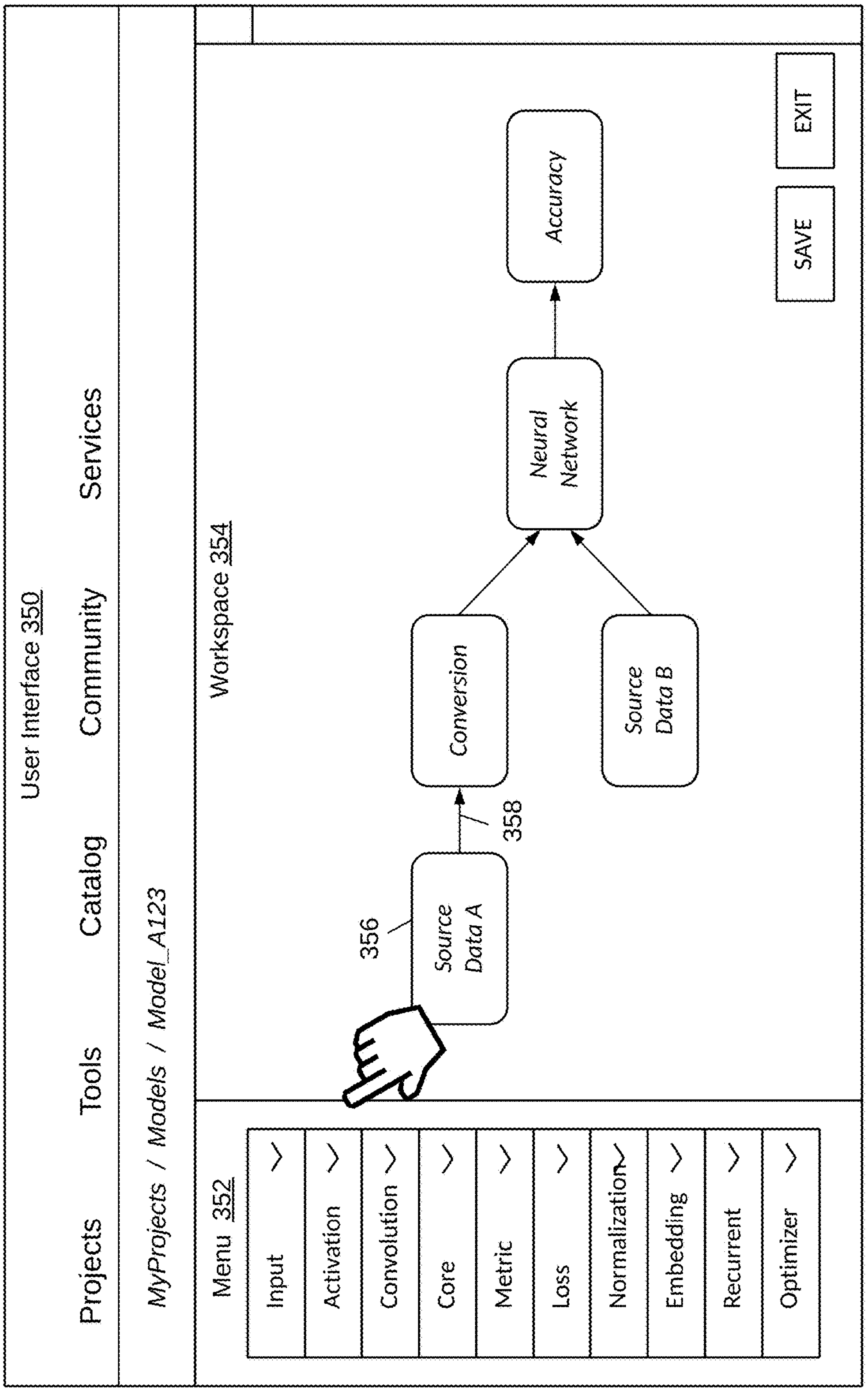
FIG. 3D illustrates a further machine learning network diagram, according to example embodiments.

FIG. 3D illustrates a process 300D of designing a new machine learning model via a user interface of the system 300B according to example embodiments. As an example, the system 300B may be output as part of the software application 330, which interacts with the IDE 340 shown in FIG. 3C, however, embodiments are not limited thereto. Referring to FIG. 3D, a user can use an input mechanism from a menu 352 of a user interface 350 to add pieces/components to a model being developed within a workspace 354 of the user interface 350.

In the example of FIG. 3D the menu 352 includes a plurality of graphical user interface (GUI) menu options which can be selected to drill down into additional components that can be added to the model design shown in the workspace 354. Here, the GUI menu includes options for adding features such as neural networks, machine learning models, AI models, data sources, conversion processes (e.g., vectorization, encoding, etc.), analytics, etc. The user can continue to add features to the model and connect them using edges or other means to create a flow within the workspace 354. For example, the user may add a node 356 to a diagram of a new model within the workspace 354. For example, the user may connect the node 356 to another node in the diagram via an edge 358, creating a dependency within the diagram. When the user is done, the user can save the model for subsequent training/testing.

In another example, the name of the object can be identified from a web page or a user interface 350 where the object is visible within a browser or the workspace 354 on the user device. A pop-up within the browser or the workspace 354 can be overlayed where the object is visible, which includes an option to navigate to the identified web page corresponding to the alternative object via a rule set.

Figure 3E:
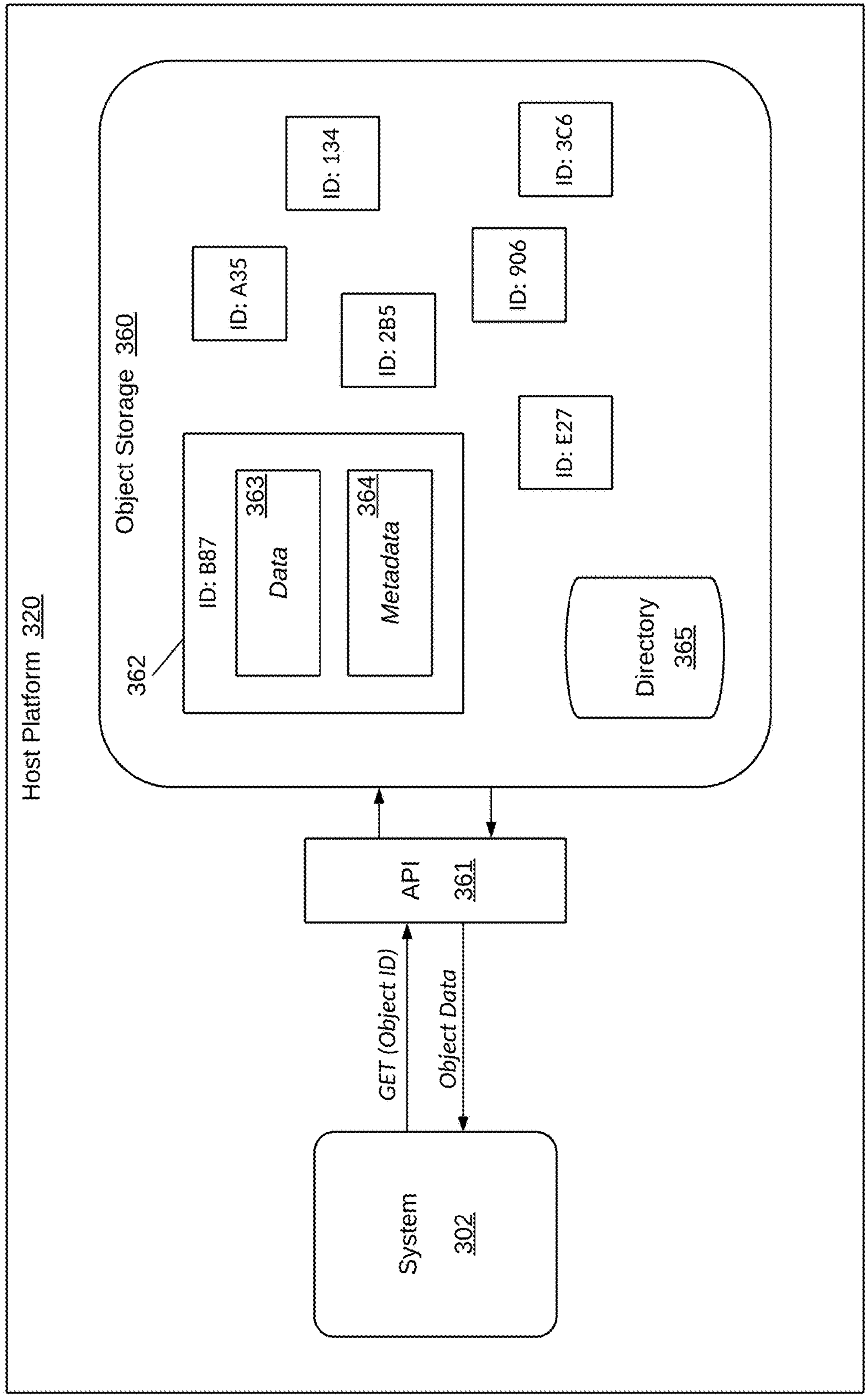
FIG. 3E illustrates a machine learning network diagram, according to example embodiments.

FIG. 3E illustrates a process 300E of accessing an object 362 from an object storage 360 of the host platform 320 according to example embodiments. For example, the object storage 360 may store data that is used by the AI models and machine learning (ML) models 330, training data, expected outputs for testing, training results, and the like. The object storage 360 may also store any other kind of data. Each object may include a unique identifier, a data section 363, and a metadata section 364, which provides a descriptive context associated with the data, including data that can later be extracted for purposes of machine learning. The unique identifier may uniquely identify an object with respect to all other objects in the object storage 360. The data section 363 may include unstructured data such as web pages, digital content, images, audio, text, and the like.

Instead of breaking files into blocks stored on disks in a file system, the object storage 360 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application 300C can use to locate and access it. In this case, the metadata is more descriptive than a file-based approach. The metadata can be customized with additional context that can later be extracted and leveraged for other purposes, such as data analytics.

The objects that are stored in the object storage 360 may be accessed via an application programming interface (API) 361. The API 361 may be a Hypertext Transfer Protocol (HTTP)-based RESTful API (also known as a RESTful Web service). The API 361 can be used by the client application 300C to query an object's metadata to locate the desired object (data) via the Internet from anywhere on any device. The API 361 may use HTTP commands such as "PUT" or "POST" to upload an object, "GET" to retrieve an object, "DELETE" to remove an object, and the like.

The object storage 360 may provide a directory 365 that uses the metadata of the objects to locate appropriate data files. The directory 365 may contain descriptive information about each object stored in the object storage 360, such as a name, a unique identifier, a creation timestamp, a collection name, etc. To query the object within the object storage 360, the client application 300C may submit a command, such as an HTTP command, with an identifier of the object 362, a payload, etc. The object storage 360 can store the actions and results described herein, including associating two or more lists of ranked assets with one another based on variables used by the two or more lists of ranked assets that have a correlation above a predetermined threshold.

Figure 4A:
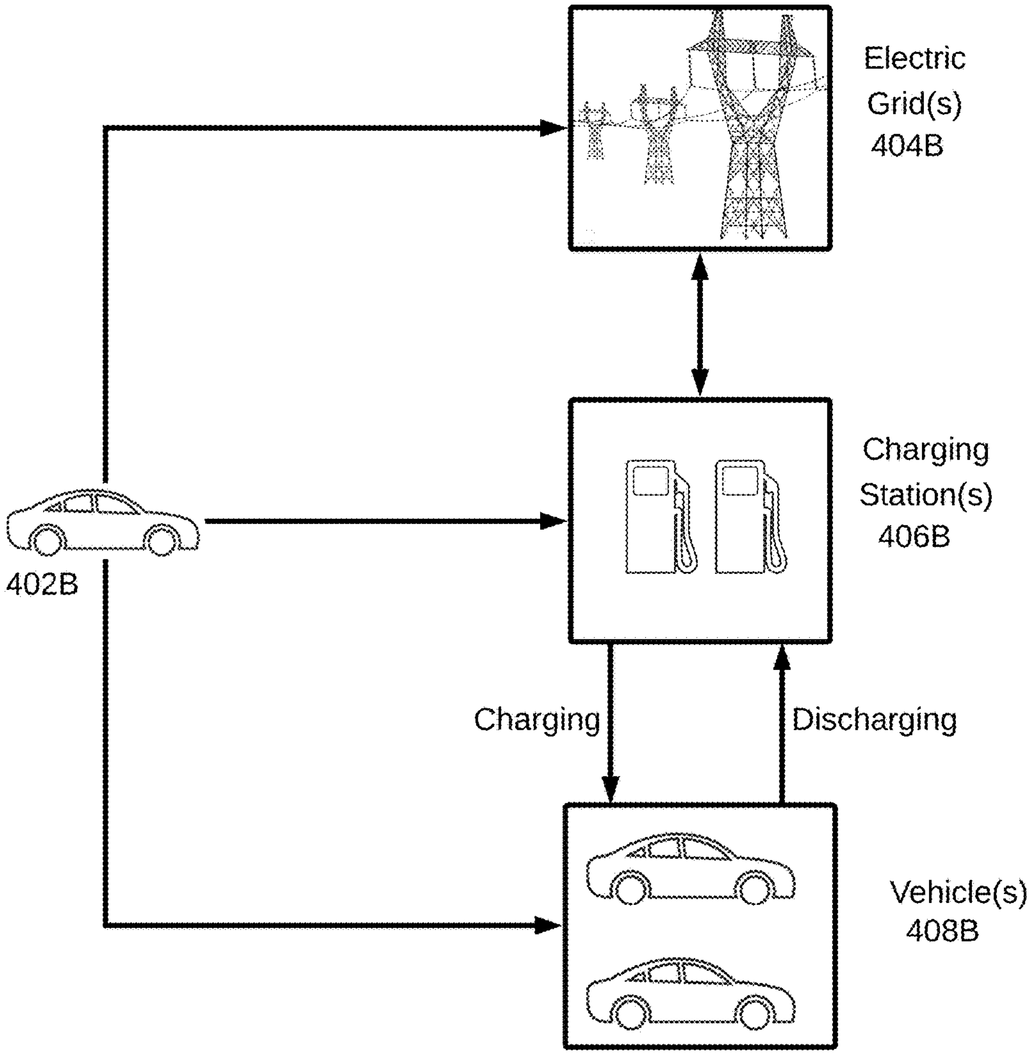
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via Vehicle to Vehicle (V2V) technology, communication over cellular, WiFi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein. Further, the safety and efficiency of the vehicle may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated on-the-fly during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/308B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can take energy from the vehicle and "push" the energy back into the grid 404B, otherwise referred to as "V2G". In bidirectional charging, the electricity flows both ways; to the vehicle and from the vehicle. When a vehicle is charged, alternating current (AC) electricity from the grid 404B is converted to direct current (DC). This may be performed by one or more of the vehicle's own converter or a converter on the charger 406B. The energy stored in the vehicle's batteries may be sent in an opposite direction back to the grid. The energy is converted from DC to AC through a converter usually located in the charger 406B, otherwise referred to as a bidirectional charger. Further, the instant solution as described and depicted with respect to FIG. 3B can be utilized in this and other networks and/or systems.

Figure 4B:
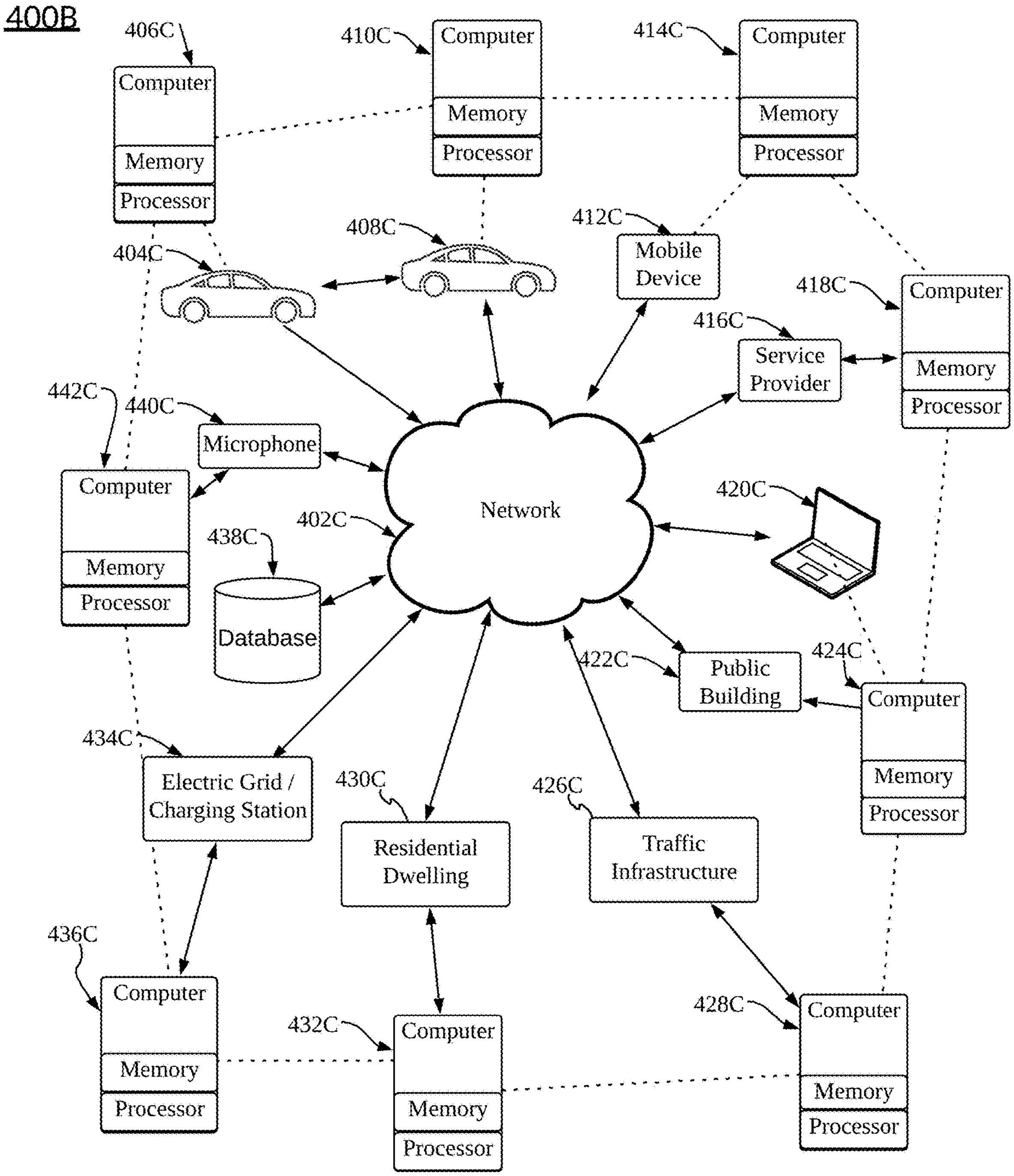
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C, 440C and 410C associated with various entities, all communicably coupled and in communication with a network 402C. A database 440C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, 440C, and 410C. The one or more public buildings 422C may include various agencies. The one or more public buildings 422C may utilize a computing device 424C. The one or more service provider 416C may include a dealership, a tow truck service, a collision center or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be self-maneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
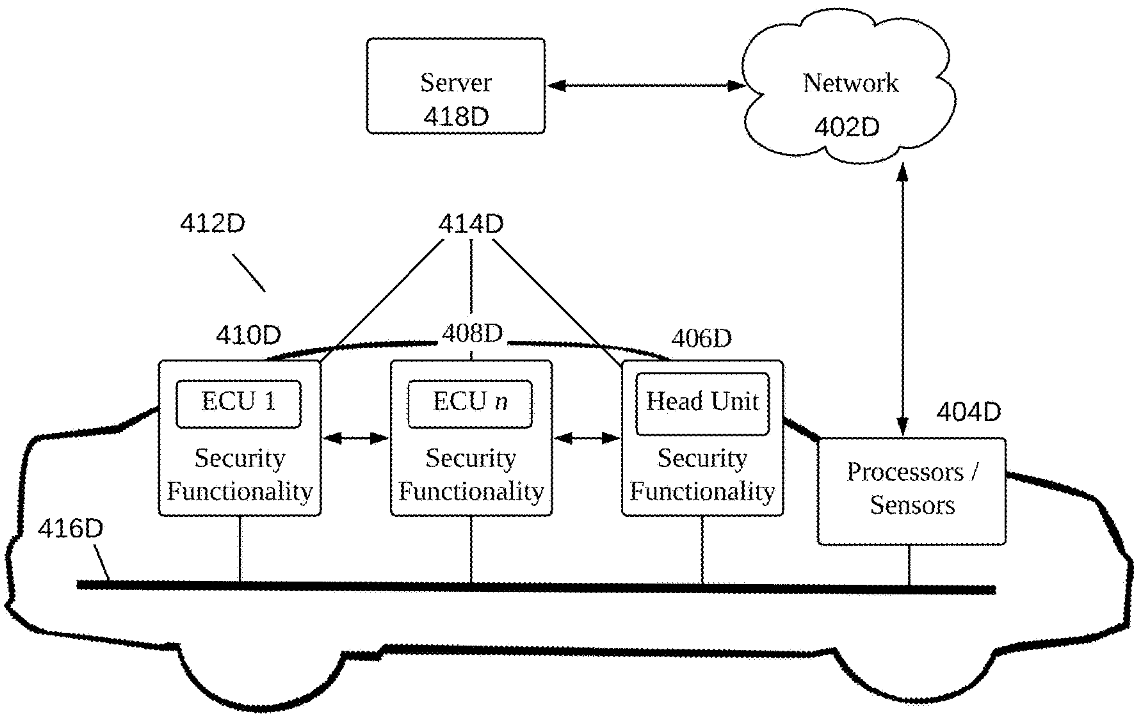
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An Electrical Control Unit (ECU) is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's Controller Area Network (CAN Bus). When an ECU encounters a process that is unauthorized, that ECU can block the process from operating. Automotive ECUs can use different contexts to determine whether a process is operating within its permitted bounds, such as proximity contexts such as nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
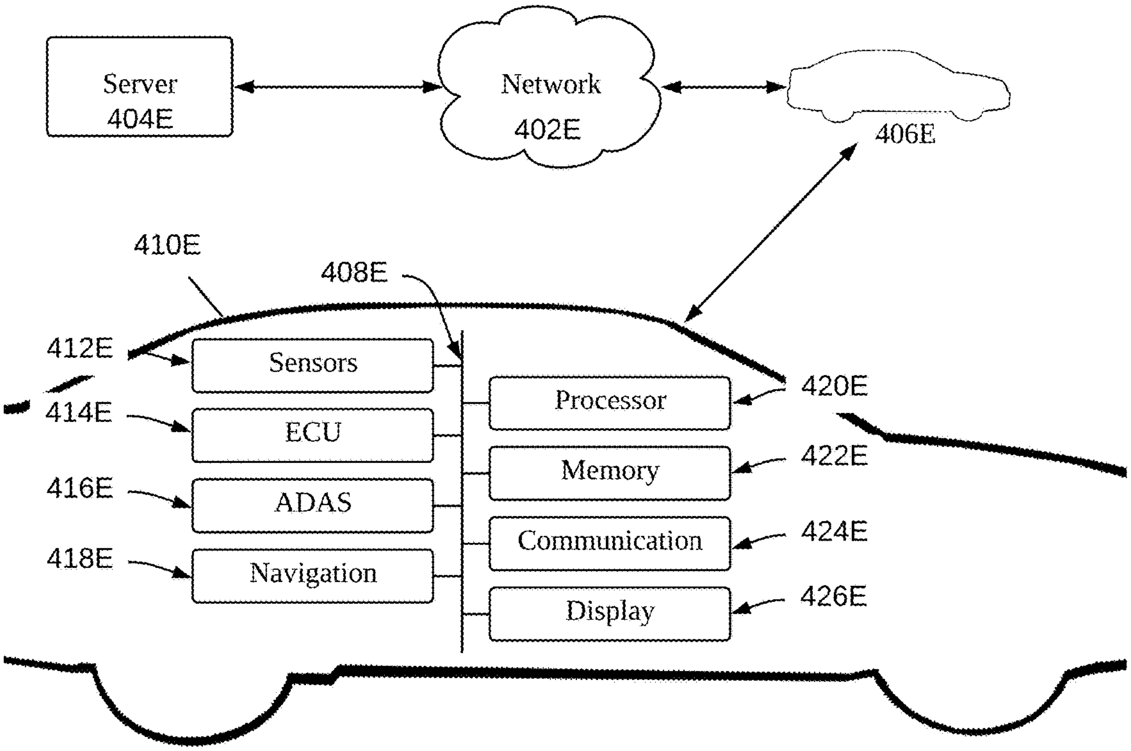
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a Controller Area Network (CAN) bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a CD-ROM device, a DVD-ROM device, a DVD-RAM device, a DVD-RW device, a flash memory device, or some other mass storage device for storing information on a permanent basis. A portion of the memory 422E may be reserved for use as a buffer or virtual random-access memory (virtual RAM). The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a Lidar sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a GPS sensor, a mapping functionality, and any other type of automotive sensor. The navigation system 418E may store the sensor data in the memory 422E.

The communication unit 424E transmits and receives data to and from the network 420E or to another communication channel. In some embodiments, the communication unit 424E may include a DSRC transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas as areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

Electronic Control Units (ECUs) are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as advanced driver-assistance systems (ADAS), sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In one embodiment, a CAN includes a CAN bus with a high and low terminal and a plurality of electronic control units (ECUs), which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decide what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
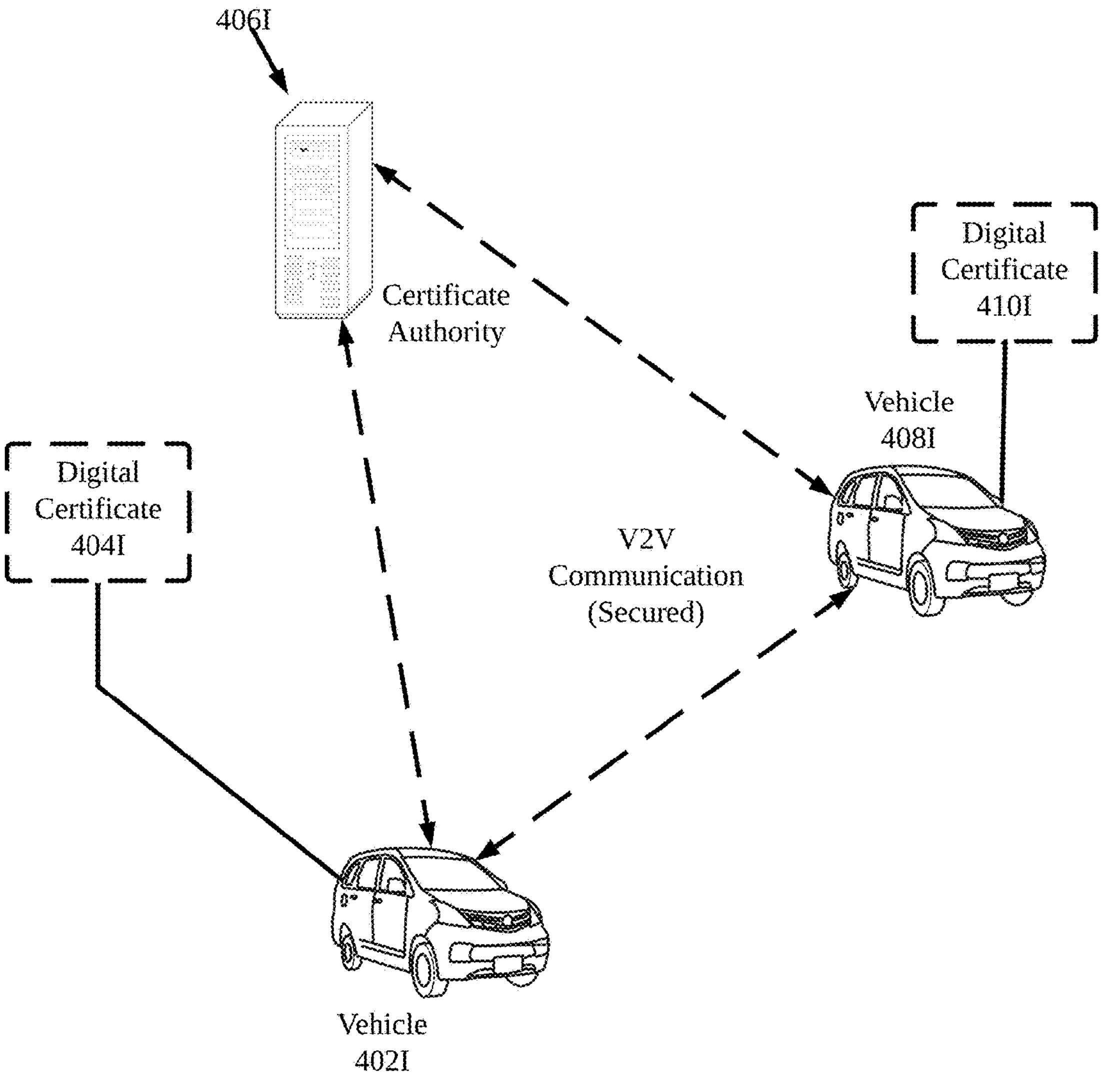
FIG. 4E illustrates yet a further diagram depicting an example of vehicles performing secured V2V communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module 308J may provide information for authenticating communications between the ECUS. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
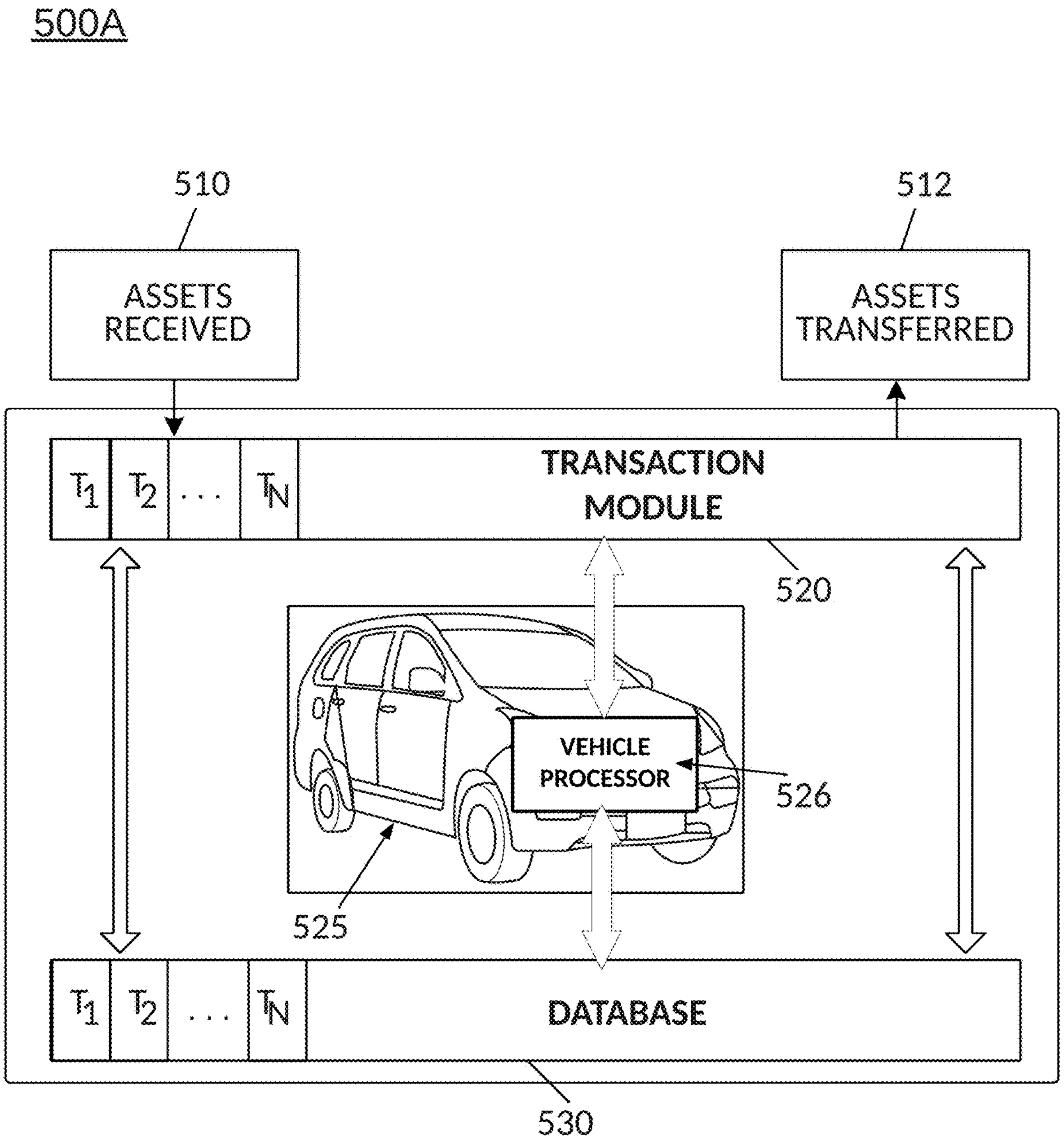
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525 is engaged in transactions (e.g., vehicle service, dealer transactions, delivery/pickup, transportation services, etc.), the vehicle may receive assets 510 and/or expel/transfer assets 512 according to a transaction(s). A vehicle processor 526 resides in the vehicle 525 and communication exists between the vehicle processor 526, a database 530, a vehicle processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the vehicle, may be off-board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in the another vehicle and communication exists between the vehicle processor, a second database, the vehicle processor and a transaction module. The another vehicle may then receive the information via a wireless communication request to perform the package pickup from the vehicle and/or from a server (not shown). The transactions are logged in the transaction modules and of both vehicles. The credits are transferred from vehicle to the another vehicle and the record of the transferred service is logged in the first and databases, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
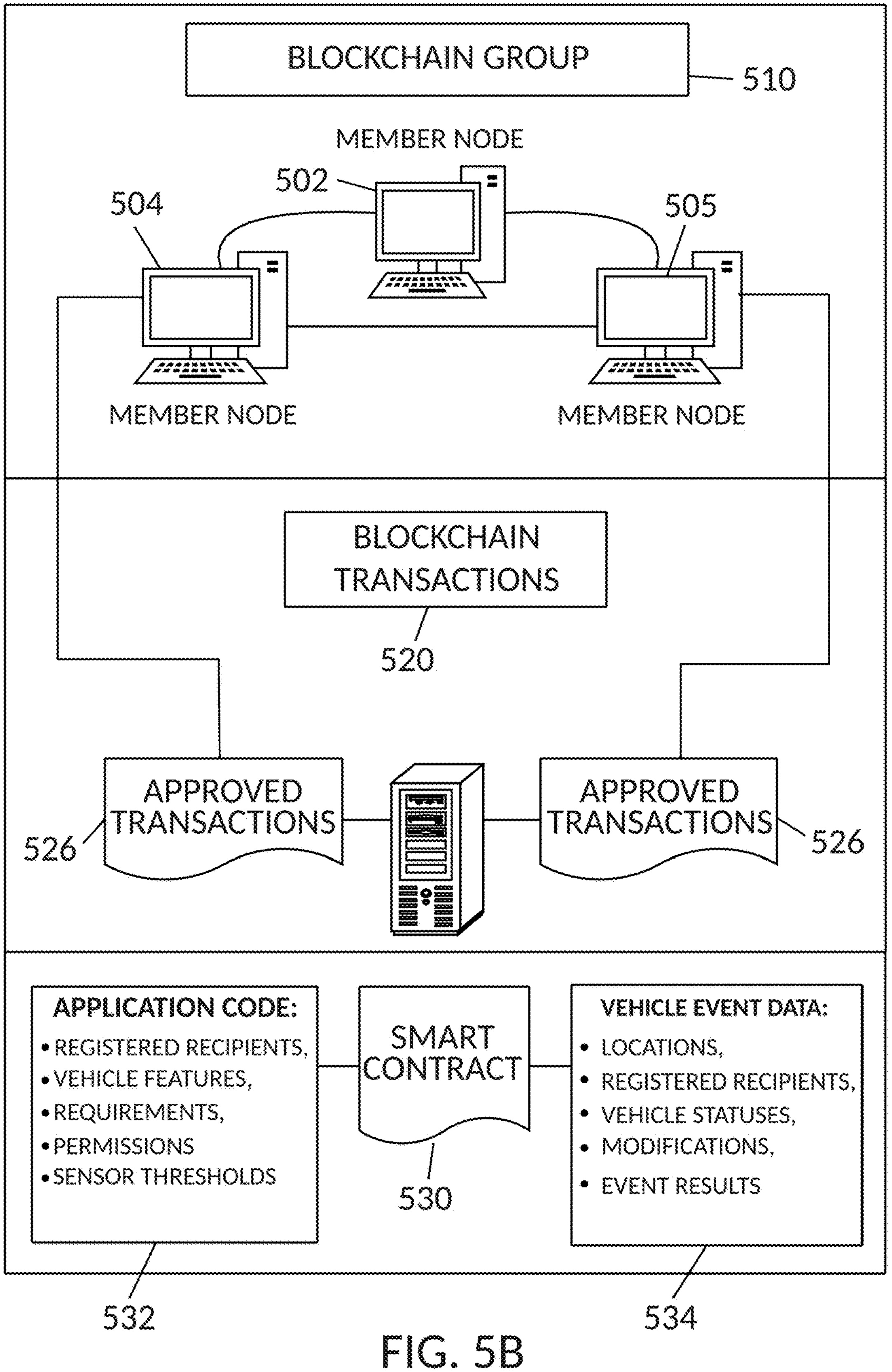
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502-506 as part of a blockchain group 510. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520 are stored in memory of computers as the transactions are received and approved by the consensus model dictated by the members' nodes. Approved transactions 526 are stored in current blocks of the blockchain and committed to the blockchain via a committal procedure, which includes performing a hash of the data contents of the transactions in a current block and referencing a previous hash of a previous block. Within the blockchain, one or more smart contracts 530 may exist that define the terms of transaction agreements and actions included in smart contract executable application code 532, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
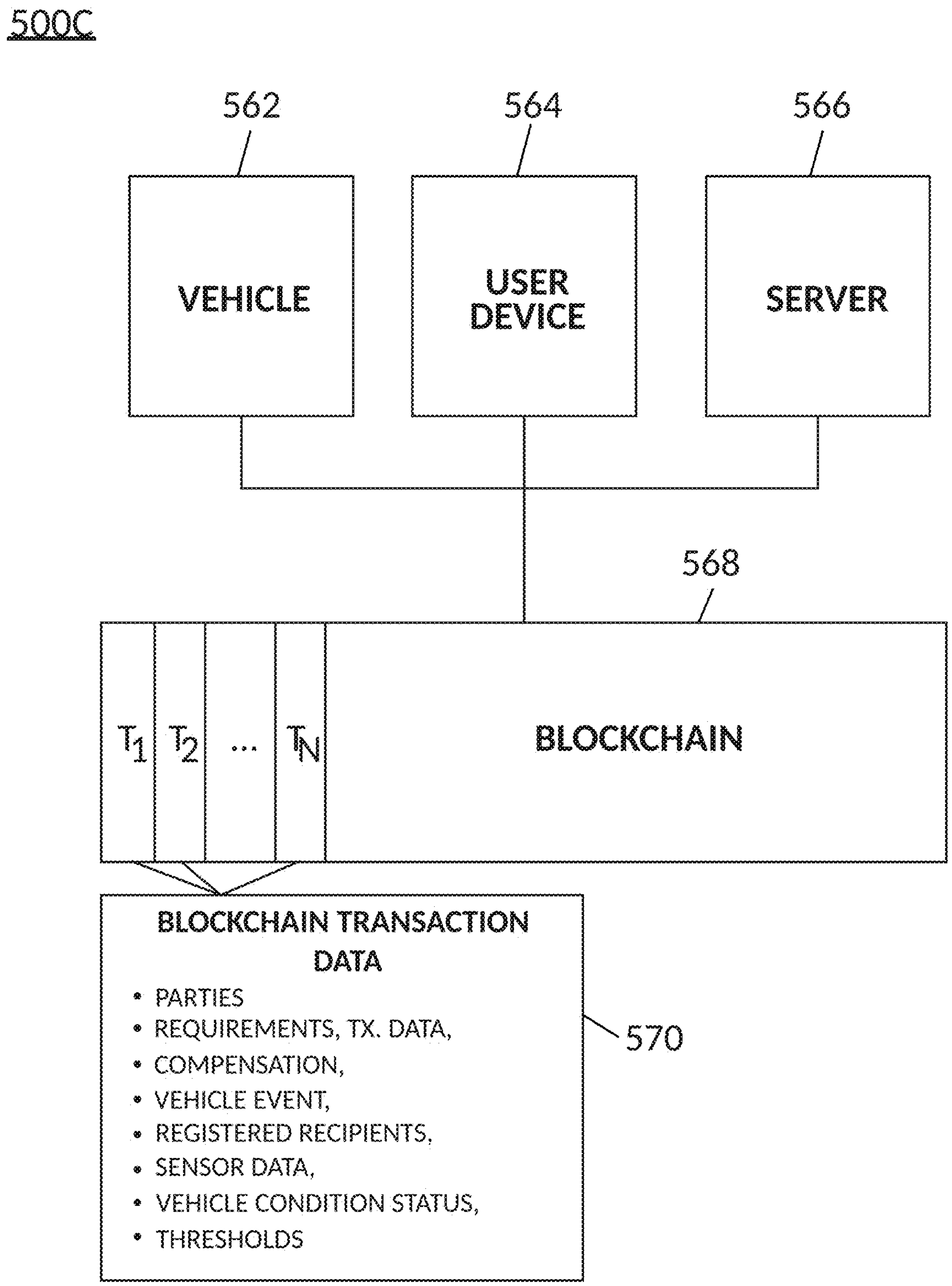
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562, the user device 564 and a server 566 sharing information with a distributed ledger (i.e., blockchain) 568. The server may represent a service provider entity inquiring with a vehicle service provider to share user profile rating information in the event that a known and established user profile is attempting to rent a vehicle with an established rated profile. The server 566 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
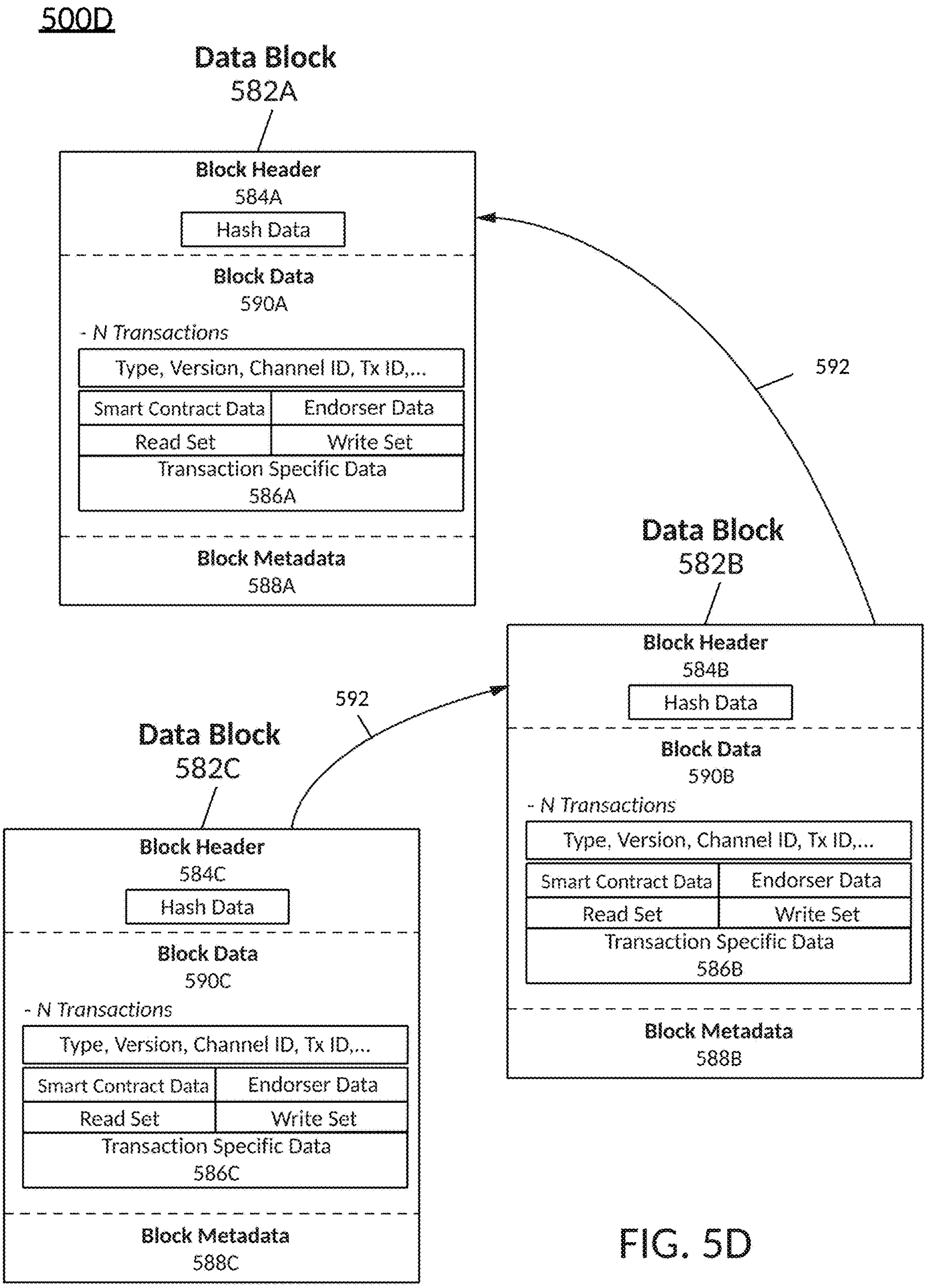
FIG. 5D illustrates an example data block interaction, according to example embodiments.

FIG. 5D illustrates blockchain blocks 580 that can be added to a distributed ledger, according to example embodiments, and contents of block structures 582A to 582*n*. Referring to FIG. 5D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584*n*, transaction-specific data 586A to 586*n*, and block metadata 588A to 588*n*. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590*n*. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 510A and a validation code identifying whether an entry was valid/invalid.

The other blocks 582B to 582*n* in the blockchain also have headers, files, and values. However, unlike the first block 582A, each of the headers 584A to 584*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

Figure 5E:
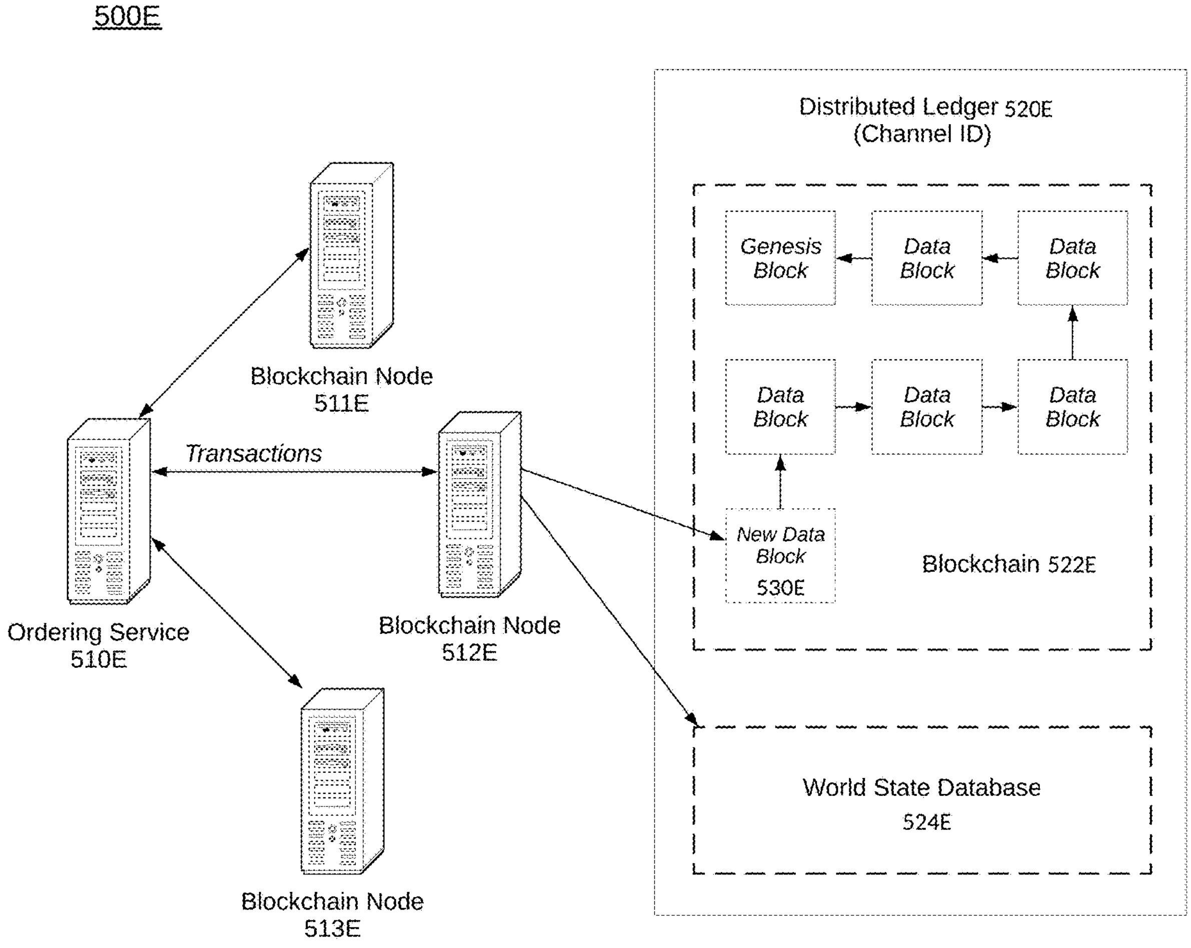
FIG. 5E illustrates a blockchain network diagram, according to example embodiments.

FIG. 5E illustrates a process 500E of a new block being added to a distributed ledger 520E, according to example embodiments, and FIG. 5B illustrates contents of a new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 520E. As an example, clients may be applications that act on behalf of a requester, such as a device, person or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 522E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data new data block 530E for storage on blockchain 520E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 520E. The architecture of the blockchain network may be designed such that the specific implementation of 'ordering' (e.g., Solo, Kafka, BFT, etc.) becomes a pluggable component.

Transactions are written to the distributed ledger 520E in a consistent order. The order of transactions is established to ensure that the updates to the state database 524E are valid when they are committed to the network. Unlike a cryptocurrency blockchain system (e.g., Bitcoin, etc.) where ordering occurs through the solving of a cryptographic puzzle, or mining, in this example the parties of the distributed ledger 520E may choose the ordering mechanism that best suits that network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
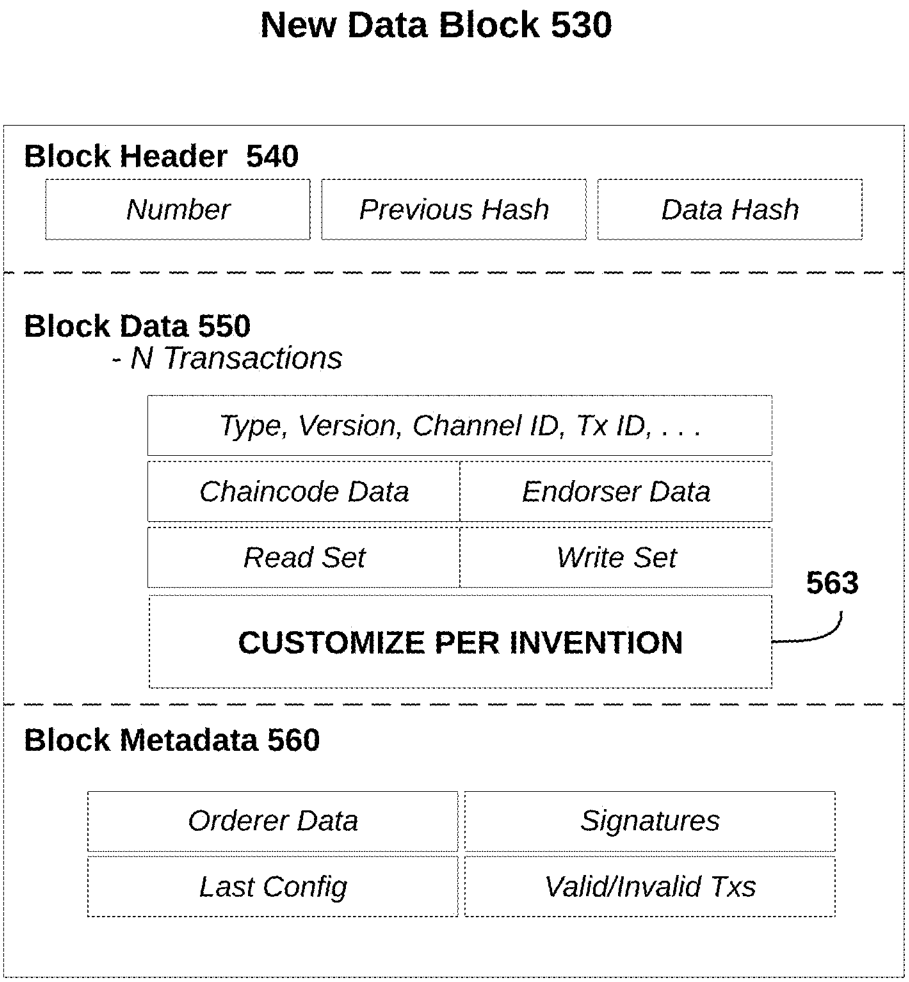
FIG. 5F illustrates an example new data block, according to example embodiments.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents. shown in FIG. 5F are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The blockchain data 563 may include software that is configured to perform one or more of analyzing, by sensors in a vehicle, objects in the vehicle related to at least one occupant, a physical condition of the at least one occupant, and spoken words of the at least one occupant, determining a destination of the vehicle, based on the analyzing, and modifying a feature of the vehicle, based on the determining.

Although in FIG. 5F the blockchain data 563 is depicted in the block data 550 but could also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E. Meanwhile, a committer of the block (such as blockchain node 512E) may add validity/invalidity information based on an endorsement policy, verification of read/write sets, and the like. The transaction filter may include a byte array of a size equal to the number of transactions in the block data 500D and a validation code identifying whether a transaction was valid/invalid.

The above embodiments may be implemented in hardware, in a computer program executed by a processor, in firmware, or in a combination of the above. A computer program may be embodied on a computer readable media, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
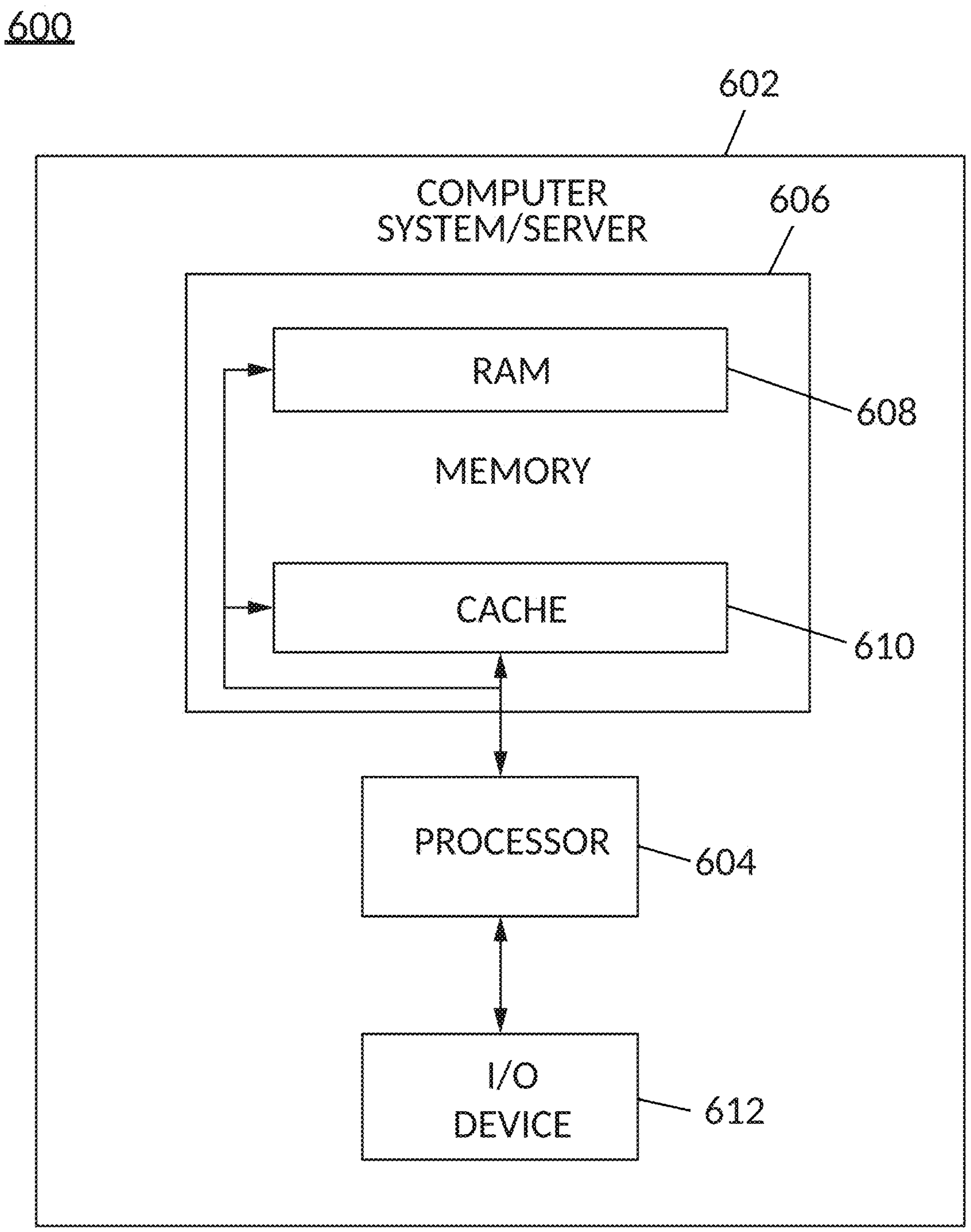
FIG. 6 illustrates an example system that supports one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one example, implements the flow diagrams of the other figures. The system memory 606 can include computer system readable media in the form of volatile memory, such as random-access memory (RAM) 608 and/or cache memory 610. Computer system/server 602 may further include other removable/non-removable, volatile/non-volatile computer system storage media. By way of example only, memory 606 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable media(s) having computer readable program code embodied thereon.

Computer system/server 602 may also communicate with one or more external devices via an I/O device 612 (such as an I/O adapter), which may include a keyboard, a pointing device, a display, a voice recognition module, etc., one or more devices that enable a user to interact with computer system/server 602, and/or any devices (e.g., network card, modem, etc.) that enable computer system/server 602 to communicate with one or more other computing devices. Such communication can occur via I/O interfaces of the device 612. Still yet, computer system/server 602 can communicate with one or more networks such as a local area network (LAN), a general wide area network (WAN), and/or a public network (e.g., the Internet) via a network adapter. As depicted, device 612 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable media has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:

capturing, by sensors in a vehicle, sensor data of objects placed into the vehicle and left there by an occupant of the vehicle;

analyzing the sensor data infer an activity associated with the objects placed into the vehicle and left there by the occupant;

determining a destination of the vehicle based on execution of a machine learning model on the inferred activity;

automatically generating a route for the vehicle to the determined destination; and controlling the vehicle to autonomously maneuver itself to the determined destination via the generated route.

2. The method of claim 1, comprising identifying a time of week and time of day; and confirming the objects in the vehicle based on the time of week and the time of day.

3. The method of claim 1, comprising identifying additional occupants; and analyzing the objects in the vehicle adjacent to the additional occupants and an age of the additional occupants.

4. The method of claim 1, further comprising determining types of the objects and locations of the objects in the vehicle.

5. The method of claim 1, further comprising initiating an information session that performs at least one of displaying information and playing audio inside a cabin of the vehicle.

6. The method of claim 1, comprising receiving occupant device sensor data from an occupant device; and determining a condition of the occupant based on the received occupant device sensor data.

7. The method of claim 1, comprising identifying an additional occupant; and determining an additional destination based on the additional occupant.

8. The method of claim 1, wherein inferring the activity associated with the objects comprises identifying a type of object placed into the vehicle and determining the activity based on a stored association between the type of object and the activity.

9. The method of claim 1, further comprising storing historical data that identifies prior instances when the objects were placed into the vehicle and corresponding destinations of the vehicle during those prior instances, and training the machine learning model based on the historical data.

10. A system, comprising:

a processor; and a memory, wherein the processor and the memory are communicably coupled, wherein the processor is configured to:

capture, by sensors in a vehicle, sensor data of objects placed into the vehicle and left there by an occupant of the vehicle;

analyze the sensor data to infer an activity associated with the objects placed into the vehicle by the occupant;

determine a destination of the vehicle based on execution of a machine learning model on the inferred activity;

automatically generate a route for the vehicle to the determined destination; and control the vehicle to autonomously maneuver itself to the determined destination via the generated route.

11. The system of claim 10, wherein the processor is configured to:

identify a time of week and time of day; and confirm the objects in the vehicle based on the time of week and the time of day.

12. The system of claim 10, wherein the processor is configured to:

identify additional occupants; and analyze the objects in the vehicle adjacent to the additional occupants and an age of the additional occupants.

13. The system of claim 10, wherein the processor is configured to:

determine types of the objects and locations of the objects in the vehicle.

14. The system of claim 10, wherein the processor is configured to:

initiate an information session that performs at least one of display information and play audio inside a cabin of the vehicle.

15. The system of claim 10, wherein the processor is configured to:

receive occupant device sensor data from an occupant device; and determine a condition of the occupant based on the received occupant device sensor data.

16. A non-transitory computer readable storage medium comprising instructions, that when read by a processor, cause the processor to perform:

capturing, by sensors in a vehicle, sensor data of objects placed into the vehicle and left there by an occupant of the vehicle;

analyzing the sensor data to infer an activity associated with the objects placed into the vehicle by the occupant;

determining a destination of the vehicle based on execution of a machine learning model on the inferred activity;

automatically generating a route for the vehicle to the determined destination; and controlling the vehicle to autonomously maneuver itself to the determined destination via the generated route.

17. The non-transitory computer readable storage medium of claim 16, wherein the instructions cause at least one processor to perform:

identifying a time of week and time of day; and confirming the objects in the vehicle based on the time of week and the time of day.

18. The non-transitory computer readable storage medium of claim 16, wherein the instructions cause at least one processor to perform:

identifying additional occupants; and analyzing the objects in the vehicle adjacent to the additional occupants and an age of the additional occupants.

19. The non-transitory computer readable storage medium of claim 16, wherein the processor is further configured to perform determining types of objects and locations of the objects in the vehicle.

20. The non-transitory computer readable storage medium of claim 16, wherein the processor is further configured to perform at least one of displaying information and playing audio inside a cabin of the vehicle.

* * * * *